(12) United States Patent
Ozeki

(10) Patent No.: US 9,599,764 B2
(45) Date of Patent: Mar. 21, 2017

(54) ILLUMINATION DEVICE, DISPLAY DEVICE AND TV RECEIVER

(71) Applicant: Sharp Kabushiki Kaisha, Osaka (JP)

(72) Inventor: Tsuyoshi Ozeki, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 119 days.

(21) Appl. No.: 14/758,922

(22) PCT Filed: Jan. 6, 2014

(86) PCT No.: PCT/JP2014/050030
§ 371 (c)(1),
(2) Date: Jul. 1, 2015

(87) PCT Pub. No.: WO2014/109301
PCT Pub. Date: Jul. 17, 2014

(65) Prior Publication Data
US 2015/0346425 A1    Dec. 3, 2015

(30) Foreign Application Priority Data

Jan. 9, 2013    (JP) .................................. 2013-001715

(51) Int. Cl.
*G02B 6/00*    (2006.01)
*F21V 8/00*    (2006.01)
*H04N 5/64*    (2006.01)

(52) U.S. Cl.
CPC ......... *G02B 6/0073* (2013.01); *G02B 6/0085* (2013.01); *G02B 6/0088* (2013.01); *G02B 6/0091* (2013.01); *H04N 5/64* (2013.01)

(58) Field of Classification Search
CPC .. G02B 6/0073; G02B 6/0085; G02B 6/0088; G02B 6/0091; H04N 5/64
See application file for complete search history.

(56) References Cited

U.S. PATENT DOCUMENTS

| 7,420,158 B2* | 9/2008 | Ohno | G02B 6/0021 |
| | | | 250/216 |
| 8,297,823 B2* | 10/2012 | Cho | G02B 6/0068 |
| | | | 349/58 |

(Continued)

FOREIGN PATENT DOCUMENTS

JP    2011-150264 A    8/2011

*Primary Examiner* — Peggy Neils
(74) *Attorney, Agent, or Firm* — Chen Yoshimura LLP

(57) ABSTRACT

Provided is a backlight device that includes: LEDs; a LED substrate; a light guide plate having a light-exiting surface, an opposite surface on an opposite side of the light-exiting surface, and a light-receiving face; a chassis; a frame; a heat dissipating member having a bottom part and a raised part; a pair of fixing members, each having a gripping part that extends along a long-side direction of the raised part and that grips each end in the long-side direction of the raised part in a direction perpendicular to a plate surface of the raised part, and a locking part that extends along the long-side direction of the raised part and that is locked to each of side faces adjacent to the light-receiving face of the light guide plate on a side of the light-receiving face. The pair of fixing members keeps a distance between the LED substrate and the light guide plate constant by fixing a distance between the gripping part and the locking part.

15 Claims, 14 Drawing Sheets

(56) References Cited

U.S. PATENT DOCUMENTS

| | | | |
|---|---|---|---|
| 8,596,850 B2 * | 12/2013 | Hirohata | G02B 6/0038 349/61 |
| 9,030,621 B2 * | 5/2015 | Kim | G02B 6/0085 349/161 |
| 2011/0181809 A1 | 7/2011 | Sekiguchi et al. | |
| 2012/0092890 A1 * | 4/2012 | Matsui | G02B 6/0091 362/607 |

* cited by examiner

ILLUMINATION DEVICE, DISPLAY DEVICE AND TV RECEIVER

TECHNICAL FIELD

The present invention relates to an illumination device, a display device, and a television receiver.

BACKGROUND ART

A liquid crystal display device, such as a liquid crystal television, for example, requires a separate backlight device as an illumination device since a liquid crystal display panel, which serves as the display panel thereof, does not emit light independently. A backlight device for this type of liquid crystal display device, depending on the mechanism thereof, is roughly categorized into a direct-lit type and an edge-lit type. For the purpose of achieving a thinner liquid crystal display device, the edge-lit backlight device is considered preferable.

In a known configuration of an edge-lit backlight device, a fixing member is provided to affix a substrate, on which a light source such as an LED or the like is mounted, to a light guide plate. By using the fixing member to keep the distance between the light source and the light guide plate constant, this configuration improves the utilization efficiency of light emitted by the light source, and prevents and suppresses display unevenness on the display surface. A backlight device with such a configuration is described in Patent Document 1, for example.

RELATED ART DOCUMENT

Patent Document

Patent Document 1: Japanese Patent Application Laid-Open Publication No. 2011-150264

PROBLEMS TO BE SOLVED BY THE INVENTION

Meanwhile, a thinner backlight device has been sought after in recent years. The aforementioned backlight device of Patent Document 1 is configured such that the light source substrate is affixed to the fixing member. The fixing members maintain the distance between the light source and the light guide plate by gripping the light guide plate in a thickness direction thereof at the edges of the light guide plate on the light-receiving face side. However, by providing the fixing members, such a configuration has the effect of increasing the thickness of the backlight device (the thickness along the thickness direction of the light guide plate), making it difficult to achieve a thinner backlight device.

SUMMARY OF THE INVENTION

The technology described in this specification has been invented in view of the problems described above. The objective of this specification is to provide a technology capable of achieving a thinner device while preventing and suppressing display unevenness by keeping the distance between the light guide plate and the light source constant.

Means for Solving the Problems

The technology described by this specification relates to an illumination device that includes: a light source; a light source substrate having a rectangular plate shape, the light source being disposed on one surface of the light source substrate; a light guide plate that guides light from the light source and that has a light-exiting surface, an opposite surface that is opposite to the light-exiting surface, and at least one rectangular light-receiving side face facing the light source and having a long-side direction parallel to a long-side direction of the light source substrate; a chassis having mat least a bottom plate that is disposed on a side of the opposite surface of the light guide plate; a frame on a side of the light-exiting surface of the light guide plate and housing at least the light source and the light guide plate between the frame and the chassis; a heat dissipating member having heat dissipating characteristics and including a bottom part that has a plate shape parallel to the bottom plate of the chassis and that is disposed on the bottom plate, and a raised part that rises from the bottom part in a rectangular plate-like shape so as to attach thereon the light source substrate such that a long-side direction of the raised part and the long-side direction of the light source substrate are parallel to each other, and such that a length along the long-side direction of the raised part is greater than a length along a long-side direction of the light source substrate; and a pair of fixing members at respective sides in the long-side direction of the light source substrate, each of the fixing members including a gripping part and a locking part, the gripping part extending along the long-side direction of the raised part and gripping each end in the long-side direction of the raised part along a direction orthogonal to a surface of the raised part, and the locking part extending along the long-side direction of the raised part and locking each side face of the light guide plate abutting the light-receiving side face thereof, the pair of fixing members thereby maintaining a gap between the light source substrate and the light guide plate.

According to the illumination device described above, each of the pair of fixing members is disposed at each side of the light source substrate. The locking part of the fixing member, which is locked to the light guide plate, is fixed to the gripping part, which grips the heat dissipating member at each end. For this reason, when the light guide plate undergoes thermal expansion or the like, the gripping part follows the movement of the locking part caused by the extension and contraction of the light guide plate. As a result, the distance between the light source substrate and the light guide plate, or the distance between the light source and the light guide plate is kept constant. This improves the utilization efficiency of light emitted by the light source, making it possible to prevent and suppress display unevenness. Further, in the illumination device described above, each of the pair of fixing members is disposed at each side in the long-side direction of the light source substrate. For this reason, disposing the fixing member does not increase the thickness of the illumination device (thickness along the thickness direction of the light guide plate), and it is possible to achieve a thinner illumination device. Thus, the illumination device described above allows for a thinner device while preventing and suppressing display unevenness by keeping the distance between the light guide plate and the light source constant. Note that configurations in which "the gripping part grips the raised part" include not only a configuration in which the gripping part grips the raised part while in direct contact with the plate surfaces of the raised part, but also a configuration in which the gripping part is space apart from the plate surfaces of the raised part by very small gaps.

The light guide plate may have recesses respectively provided in the side faces of the light guide plate abutting the light-receiving side face thereof and respectively extending along a thickness direction of the light guide plate, and the locking part of each of the fixing members may be locked to the light guide plate by being fitted to the corresponding recess.

According to this configuration, it is possible to effectively fix the locking part to the light guide plate by fitting and locking the locking part to the recess.

The locking part of each of the fixing members may be fitted to the corresponding recess such that a gap exists between the locking part and the recess in a direction that is parallel to the long-sidedirection of the light-receiving side face.

According to this configuration, even if the light guide plate stretches in the plate-surface direction (the long-side direction of the raised part), the part of the light guide plate facing the locking part stretches inside the aforementioned space, making it more difficult for the fixing member to be pushed out of the recess as a consequence of the stretching of the light guide plate. As a result, it is possible to maintain the position of the fixing member even if the light guide plate undergoes stretching or the like.

The light guide plate may have protrusions respectively provided in the side faces of the light guide plate abutting the light-receiving side face thereof and respectively extending along a thickness direction of the light guide plate, and the locking part of each of the fixing members may be locked to the light guide plate by the locking part gripping the corresponding protrusion in the direction orthogonal to the surface of the raised part.

When a recess is provided in the light guide plate, light entering the light guide plate may leak into the recess and cause unevenness within the light guide plate. According to the configuration described above, by providing the protrusion at the parts of the light guide plate that are locked to the locking part, it is possible to prevent unevenness in light entering the light guide plate.

The locking part of each of the fixing members may grip the corresponding protrusion such that a gap exists between the locking part and the protrusion in a direction that is parallel to the long-sidedirection of the light-receiving side face.

According to this configuration, even if the light guide plate stretches along the plate-surface direction (long-side direction of the raised part), the part of the light guide plate facing the locking part stretches inside the aforementioned space. For this reason, the fixing member is less likely to be pushed in a direction away from the light guide plate as a result of the stretching of the light guide plate. As a result, it is possible to maintain the position of the fixing member even if the light guide plate undergoes stretching or the like.

A cushioning member made of a urethane material may be disposed between each of the pair of fixing members and the frame.

According to this configuration, the distances between the pair of fixing members and the frame are respectively regulated by the cushioning members. For this reason, even if the light guide plate undergoes thermal expansion or the like, the light guide plate and the fixing members are less likely to shift to one side or the other along the plate-surface direction of the light guide plate (the long-side direction of the raised part). Further, the cushioning member is made of a urethane material, which effectively makes the cushioning member contractible.

The fixing members may be spaced apart from the frame.

According to this configuration, it is less likely that the fixing member interferes with the frame, even if the light guide plate expands laterally along the long-side direction of the light-receiving side face. As a result, it is possible to prevent and suppress deformation, damage, or the like to the fixing member caused by the fixing member interfering with the frame.

A heat conducting member having contractible characteristics may be disposed between the raised part of the heat dissipating member and the frame.

According to this configuration, it is possible to absorb the movement of the raised part with the heat conducting member if the raised part is pushed away from a light guide plate via the fixing member due to a thermal expansion or the like of the light guide plate. At the same time, it is possible to disperse heat from the raised part toward the frame side via the heat conducting member.

Each of the pair of fixing members may have a body part extending in the direction orthogonal to the surface of the raised part and connecting the gripping part and the locking part, and a width of the body part may be equal to a thickness of the light guide plate.

According to this configuration, light emitted by the light source and proceeding toward a side (toward a side along the long-side direction of the raised part) is more easily blocked by the body part than if the width of the body part is smaller than the thickness of the light guide plate. This makes it less likely that light emitted by the light source escapes to the side. As a result, it is possible to prevent and suppress luminance unevenness in the display surface caused by light leakage.

The fixing members may be formed by a metal material having a thermal conductivity that is lower than a thermal conductivity of the chassis.

According to this configuration, it is possible to achieve both rigidity and low thermal conductivity with respect to the fixing member.

The locking part of each of the fixing members may be able to be locked to the light guide plate by causing the locking part to slide along a thickness direction of the light guide plate.

According to this configuration, it is possible to remove the fixing member without removing the light guide plate from the enclosure when the illumination device is disassembled, thereby making the disassembly of the illumination device easier.

The bottom part of the heat dissipating member may extend from an edge of the raised part on a side of the bottom plate toward a central side of the light guide plate.

If the bottom part is configured so as to extend from the edge of the raised part on the bottom plate side toward the side opposite to the center of the light guide plate, it will become necessary to secure a larger space to dispose the bottom part between the heat dissipating member and the enclosure. This will therefore make it more difficult to achieve a narrower frame. According to the configuration described above, it is not necessary to secure a large space to dispose the bottom part between the heat dissipating member and the enclosure. This makes it possible to effectively transfer heat from the bottom part to the bottom plate side and allow the frame of the illumination device to be narrower.

The technology described in this specification may be expressed as a display device equipped with the illumination device described above and a display panel that displays an image with light from the illumination device described above. In addition, a display device employing a liquid crystal panel that uses liquid crystal is also a new and useful art. Further, a television receiver including the display device described above is also a new and useful art.

Effects of the Invention

According to the technology described in this specification, it is possible to provide a technology capable of achieving a thinner device while preventing and suppressing display unevenness by keeping the distance between the light guide plate and the light source constant.

DETAILED DESCRIPTION OF EMBODIMENTS

<Embodiment 1>

Embodiment 1 will be described with reference to diagrams. In the present embodiment, a liquid crystal display device 10 will be used as an example. A part of each diagram shows an x-axis, a y-axis, and a z-axis, which are illustrated so that the axis directions are common in all diagrams. Among these axis directions, the y-axis direction matches the vertical direction while the x-axis direction matches the horizontal direction. Additionally, top and bottom will be indicated based on the vertical direction, unless otherwise noted.

Figure 1:
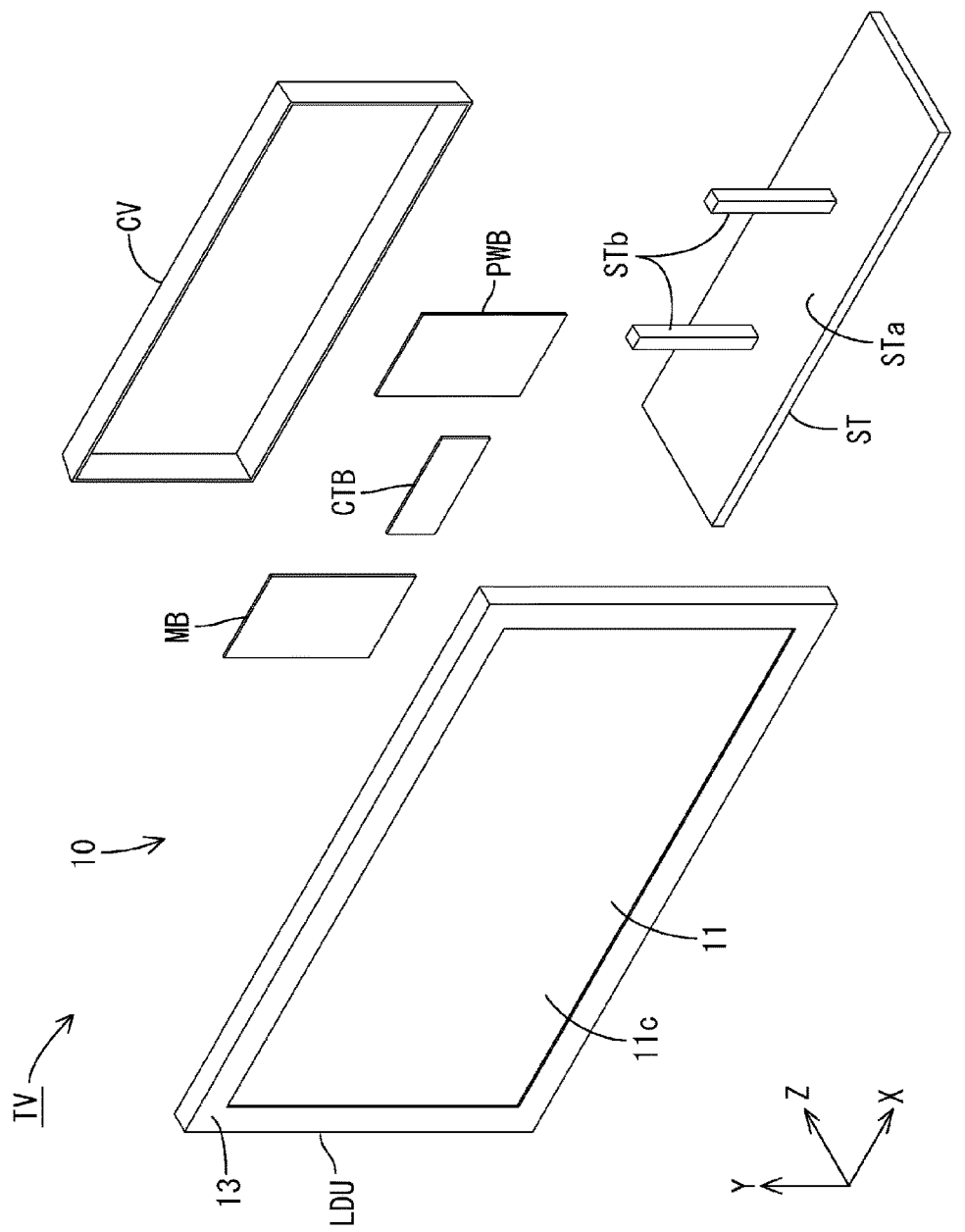
FIG. 1 is an exploded perspective view showing a schematic configuration of a television receiver TV and a liquid crystal display unit LDU according to Embodiment 1.
Figure 2:
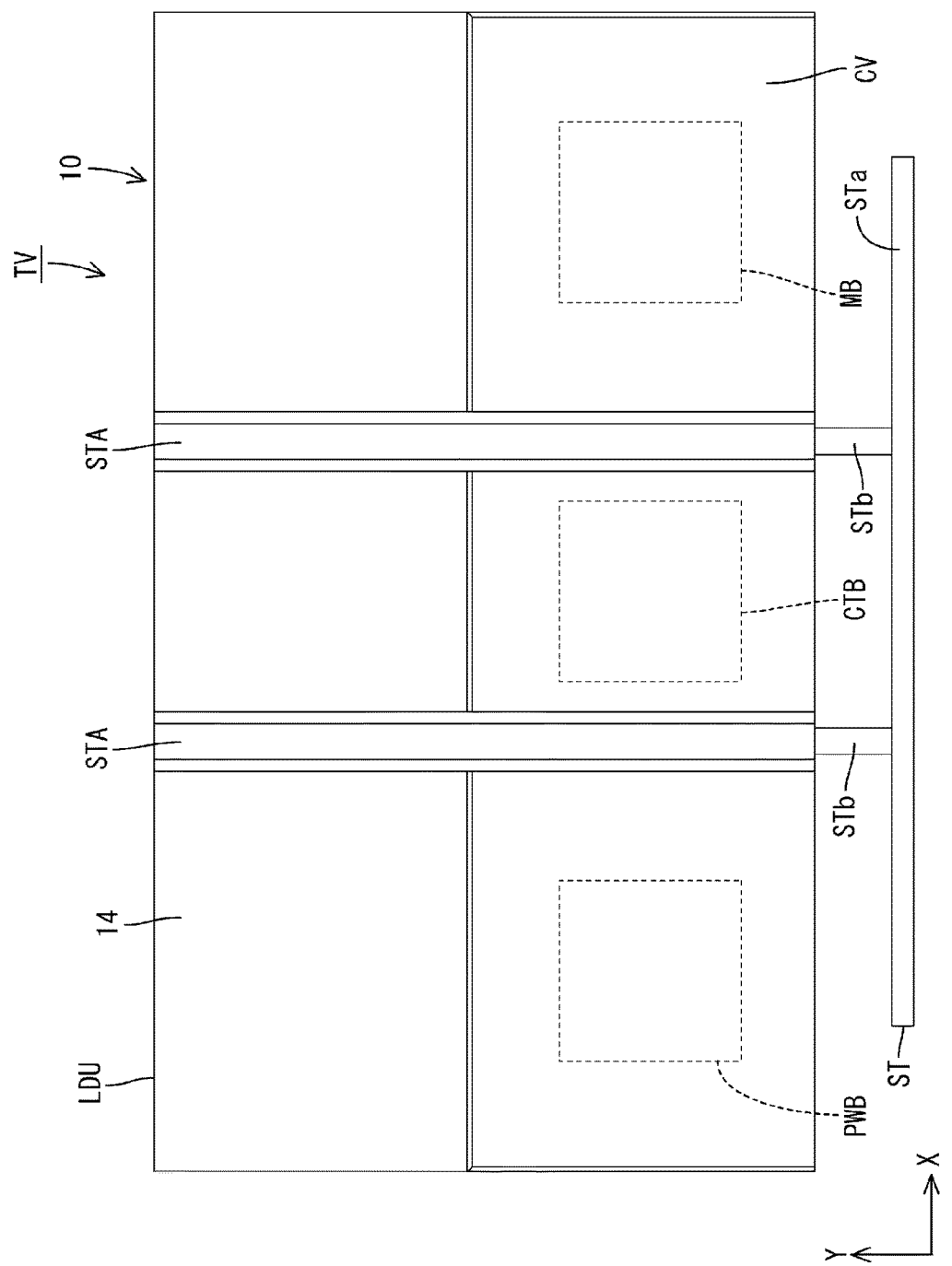
FIG. 2 is a reverse view of the television receiver TV and a liquid crystal display device 10.

A television receiver TV is equipped with: a liquid crystal display unit LDU; boards PWB, MB, and CTB mounted on a reverse surface side (back surface side) of the liquid crystal display unit LDU; a cover member CV mounted on the reverse surface side of the liquid crystal display unit LDU so as to cover the boards PWB, MB, and CTB; and a stand ST. The television receiver TV is held by the stand ST so that a display surface of the liquid crystal display unit LDU is extended along the vertical direction (the y-axis direction). The liquid crystal display device 10 according to the present embodiment is configured by excluding, at a minimum, a configuration for receiving television signals (such as a tuner part of a main board MB) from the configuration of the television receiver TV described above. As shown in FIG. 2, the liquid crystal display unit LDU assumes a horizontally long rectangular shape (rectangular shape; long shape) as a whole, and is equipped with a liquid crystal panel 11, which is a display panel, and a backlight device 12, which is an external light source. The liquid crystal display unit LDU is configured such that these components are held as one unit by a frame 13 and a chassis 14, which are exterior members constituting the exterior of the liquid crystal display device 10. While constituting a part of the exterior, the chassis 14 according to the present embodiment also constitutes a part of the backlight device 12.

First, a configuration of a reverse surface side of the liquid crystal display device 10 will be described. On a reverse surface of the chassis 14, which constitutes the exterior of the reverse side of the liquid crystal display device 10, a pair of stand mounting members STA extending along the y-axis direction is mounted at two positions spaced apart along the x-axis direction, as shown in FIG. 2. The cross sections of these stand mounting members STA have a substantially channel shape opened to the side of the chassis 14, so that a pair of supports STb of the stand ST can be inserted into the spaces between the stand mounting members STA and the chassis 14. In the spaces within the stand mounting members STA, wiring members (such as electrical wires) connected to an LED substrate 18 of the backlight device 12 are passed through. The stand ST is constituted by: a base STa aligned parallel to the x-axis direction and the z-axis direction; and the pair of supports STb standing along the y-axis direction from the base STa. The cover member CV, made of a synthetic resin, is mounted so as to cover an approximately lower half of the reverse surface of the chassis 14 shown in FIG. 2 while cutting across the pair of stand mounting members STA in the x-axis direction. Held between the cover member CV and the chassis 14 is a component-housing space capable of holding components such as the boards PWB, MB, and CTB, which will be described next.

As shown in FIG. 2, the boards PWB, MB, and CTB include a power supply board PWB, a main board MB, and a control board CTB. The power supply board PWB can be described as a power supply source of the liquid crystal display device 10 that is capable of supplying driving power to other boards MB and CTB, as well as to LEDs 17 and the like of the backlight device 12. Therefore, it can be said that the power supply board PWB also serves as an "LED driver board driving the LEDs 17." The main board MB has, at a minimum, a tuner part capable of receiving television signals and an image processing part that processes the received television signals into images (neither the tuner part nor the image processing part is illustrated), and is capable of outputting the processed image signals to the control board CTB, which will be described next. Note that if the liquid crystal display device 10 is connected to an external image playback device not shown in the diagram, input of image signals are received from that image playback device. The main board MB can then process the image signals in the image processing part and output the image signals to the control board CTB. The control board CTB serves a function of converting the image signals inputted by the main board into signals for driving liquid crystal and supplying the converted signals for driving liquid crystal to the liquid crystal panel 11.

Figure 3:
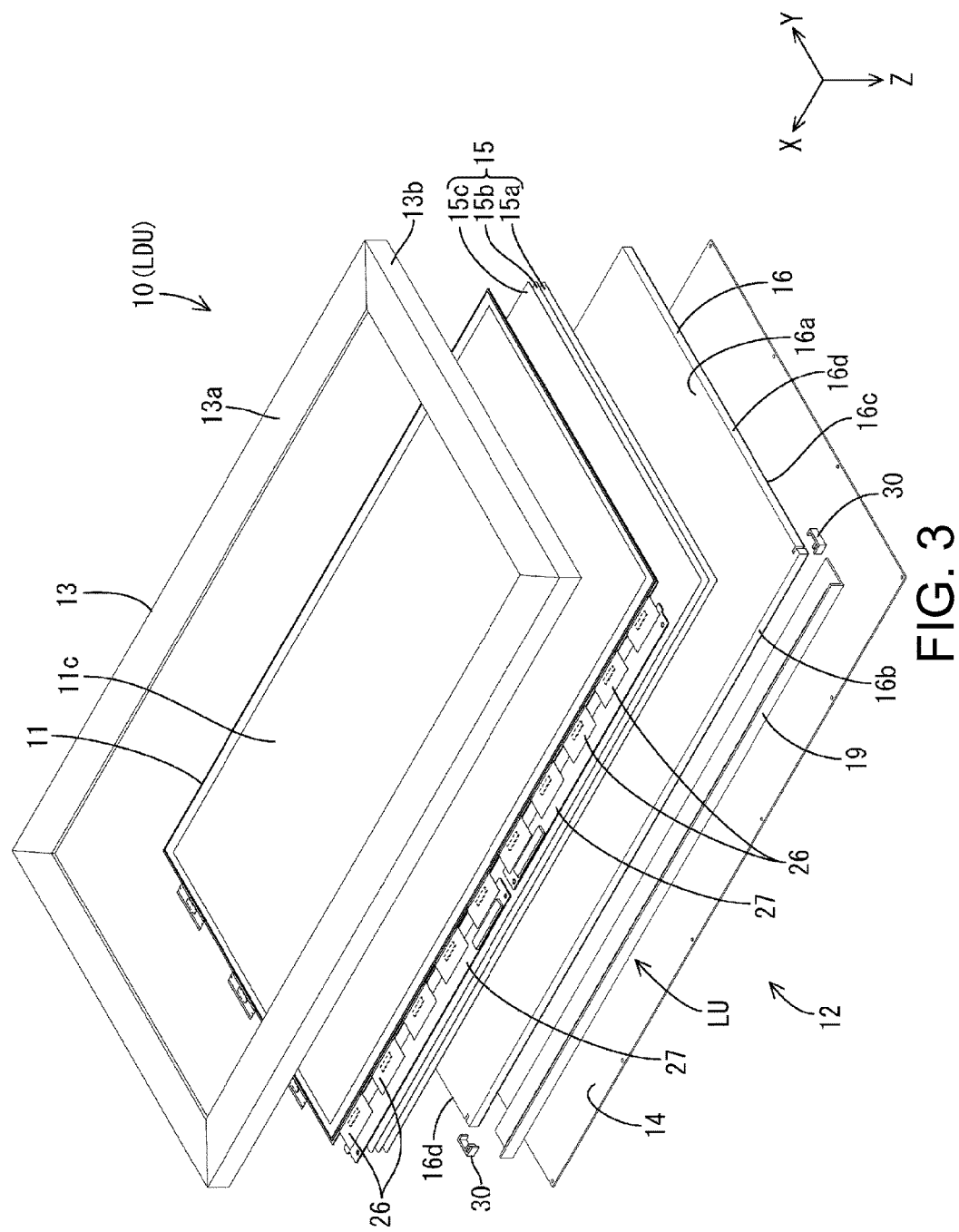
FIG. 3 is an exploded perspective view showing a schematic configuration of the liquid crystal display unit LDU of the liquid crystal display device 10.

As shown in FIG. 3, the main components of the liquid crystal display unit LDU, which constitutes a part of the liquid crystal display device 10, are held inside a space between the frame 13, which constitutes the exterior of the front side, and the chassis 14, which constitutes the exterior of the reverse side. The main components housed inside the frame 13 and the chassis 14 at least include: the liquid crystal panel 11, optical members 15, a light guide plate 16, an LED unit LU, and a pair of fixing members (an example of fixing members) 30 and 30. Among these, the liquid crystal panel 11, the optical members 15, and the light guide plate 16 are held so as to be gripped by the frame 13 on the front side and the chassis 14 on the reverse side, while being stacked onto one another. The backlight device 12 is constituted by the optical members 15, the light guide plate 16, the pair of fixing members 30 and 30, and the chassis 14, and is a configuration of the aforementioned liquid crystal display unit LDU excluding the liquid crystal panel 11 and the frame 13. The LED unit LU is disposed so as to face the side face along one of the long sides of the light guide plate 16. The LED unit LU is constituted by: the LEDs (an example of the light source) 17; the LED substrate (an example of the light source substrate) 18, on which the LEDs 17 are mounted; and a heat dissipating member 19, to which the LED substrate 18 is attached. Each of the pair of fixing members 30 and 30 is disposed on each side of the light guide plate 16 near a light-receiving face 16b (see FIG. 3). Note that the pair of fixing members 30 and 30 will be described later in detail. Each of the components will be described below.

As shown in FIG. 3, the liquid crystal panel 11 assumes the shape of a horizontally long rectangle (rectangular shape) in plan view. The liquid crystal panel 11 is configured such that a pair of glass substrates 11a and 11b with superior transparency (see FIG. 4) is attached together with a prescribed gap therebetween and liquid crystal is sealed between the substrates 11a and 11b. Provided on one substrate (an array substrate) 11b are: switching elements (TFTs, for example), which are connected to source wiring lines and gate wiring lines that cross each other at right angles; pixel electrodes, which are connected to the switching elements; an alignment film; and the like. The other substrate (a CF substrate) 11a is provided with: color filters, on which color parts such as R (red), G (green), and B (blue) are respectively arranged in a prescribed sequence; an opposite electrode; an alignment film; and the like. The liquid crystal panel 11 is stacked onto the front side of the optical members 15, which will be described later. A surface on the reverse side of the liquid crystal panel 11 (outer surface of the polarizing plate on the reverse side) is adhered to the optical members 15 with almost no space therebetween. This prevents dust, debris, or the like from entering between the liquid crystal panel 11 and the optical members 15. The display surface 11c of the liquid crystal panel 11 is constituted by: a display region in the center of the screen capable of displaying images; and a frame-shaped non-display region found in the outer edges of the screen surrounding the display region. The liquid crystal panel 11 is connected to a control board (not illustrated) via driver components for driving liquid crystal and flexible substrates (not illustrated), and images are displayed in the display region of the display surface 11c based on the signals inputted by the control board. Additionally, polarizing plates (not illustrated) are respectively provided on the outside of both of the substrates 11a and 11b.

As shown in FIG. 3, the optical members 15 assume a horizontally long, rectangular shape in plan view in a manner similar to the liquid crystal panel 11, and are comparable to the liquid crystal panel 11 in size (short side dimensions and long side dimensions). The optical members 15 are placed so as to be stacked on the front side (the light-exiting side) of the light guide plate 16, which will be described later, and are disposed so as to be gripped between the aforementioned liquid crystal panel 11 and the light guide plate 16. Three optical members 15, all sheet-like, are disposed so as to be laminated onto one another, and are specifically constituted by, from the reverse side (the side of the light guide plate 16): a diffusion sheet, a lens sheet (prism sheet), and a reflective polarizing sheet. Note that the sizes of the three sheets are approximately equal in plan view.

Figure 4:
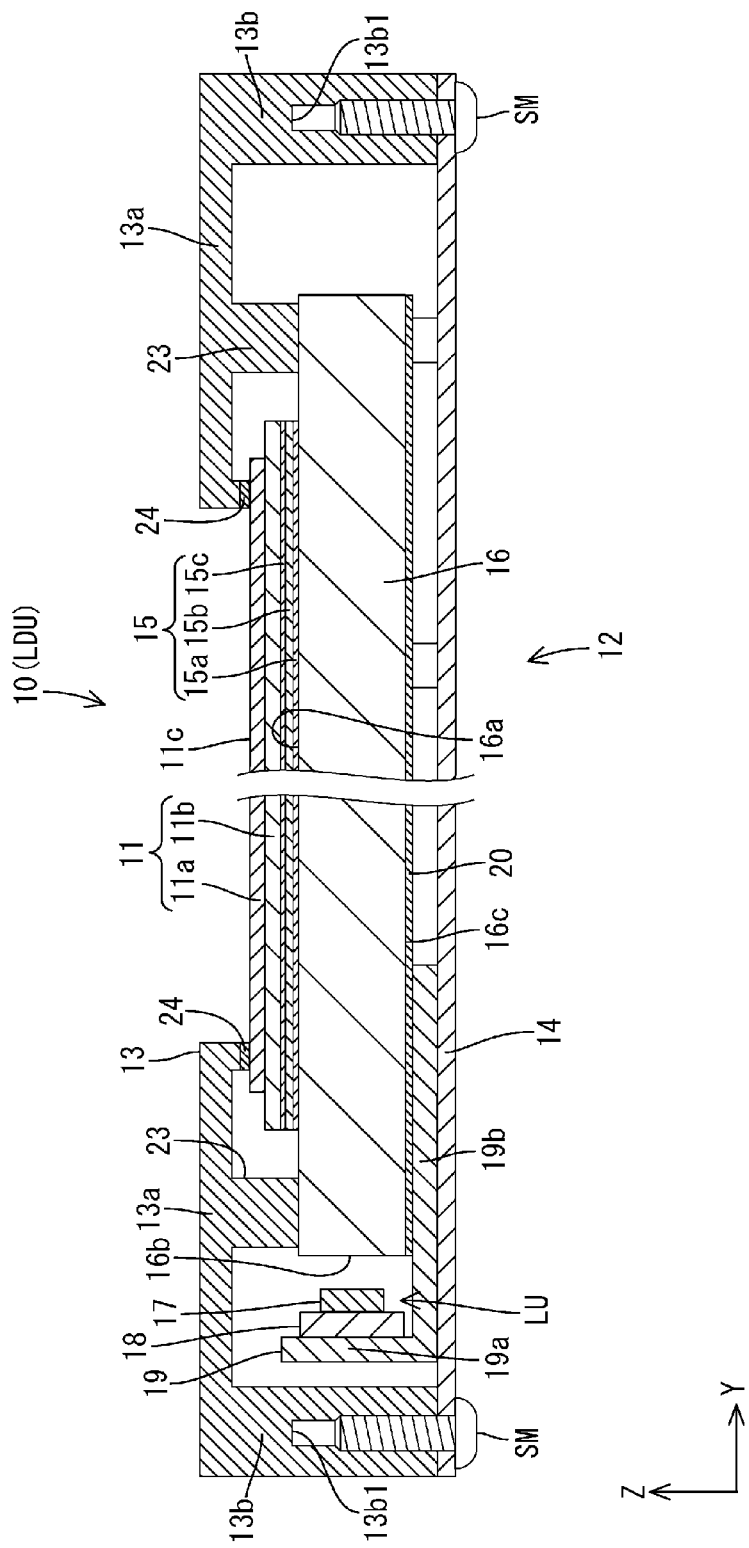
FIG. 4 is a cross-sectional view showing a cross-sectional configuration of the liquid crystal display device 10 along a short side direction thereof.

The light guide plate 16 is made of a synthetic resin with a refractive index that is sufficiently higher than that of air and that is nearly transparent (superior in transparency) (for example: acrylic resin such as PMMA, or polycarbonate). As shown in FIG. 3, the light guide plate 16 has a horizontally long rectangular shape in plan view in a manner similar to the liquid crystal panel 11 and the optical members 15 and takes the shape of a plate that is thicker than the optical members 15. The long-side direction and the short-side direction of the principal surfaces of the light guide plate 16 respectively match the x-axis direction and the y-axis direction, while the plate-thickness direction, which is orthogonal to the principal surfaces, matches the z-axis direction. The light guide plate 16 is stacked onto the reverse side of the optical members 15 and is disposed so as to be gripped between the optical members 15 and the chassis 14. As shown in FIG. 4, at least the short-side dimensions of the light guide plate 16 are larger than the short-side dimensions of the liquid crystal panel 11 and the optical members 15, respectively, and both ends of the short sides (both ends along the long-side direction) are disposed so as to protrude outward from both ends of the liquid crystal panel 11 and the optical members 15 (so as not to overlap in plan view). The light guide plate 16 is disposed so as to be gripped by the LED unit LU disposed on one side of the short-side direction and a side wall 13b of the frame 13 disposed on the other side of the short-side direction, so that light from the LEDs 17 is introduced from one end of the short-side direction. The light guide plate 16 serves a function of transmitting light from the LEDs 17 introduced from one end of the short-side direction while redirecting light toward the optical members 15 side (front side) to exit therefrom.

Figure 5:
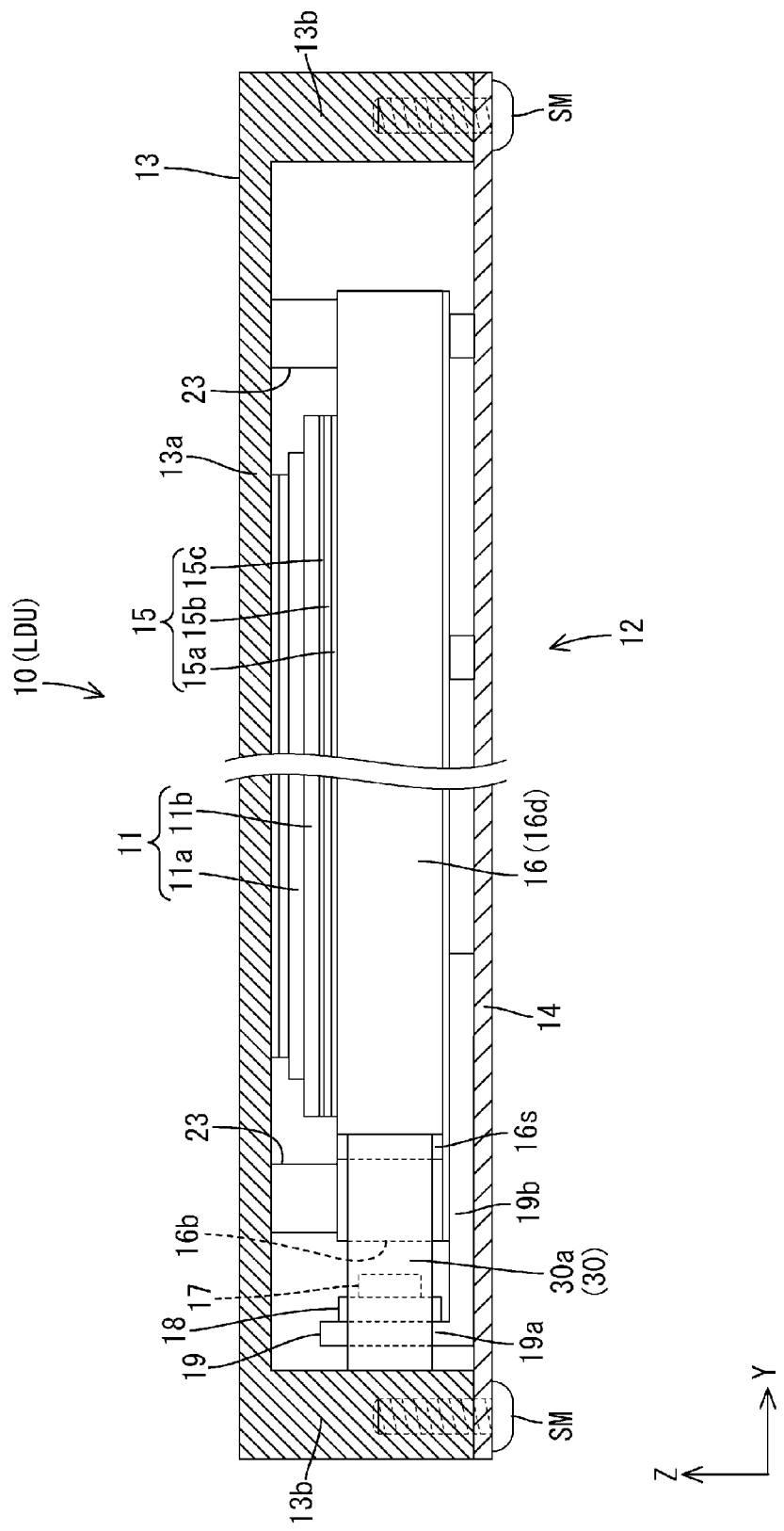
FIG. 5 is a side view of the liquid crystal display device 10 when seen from a side of one short side of a light guide plate 16.
Figure 6:
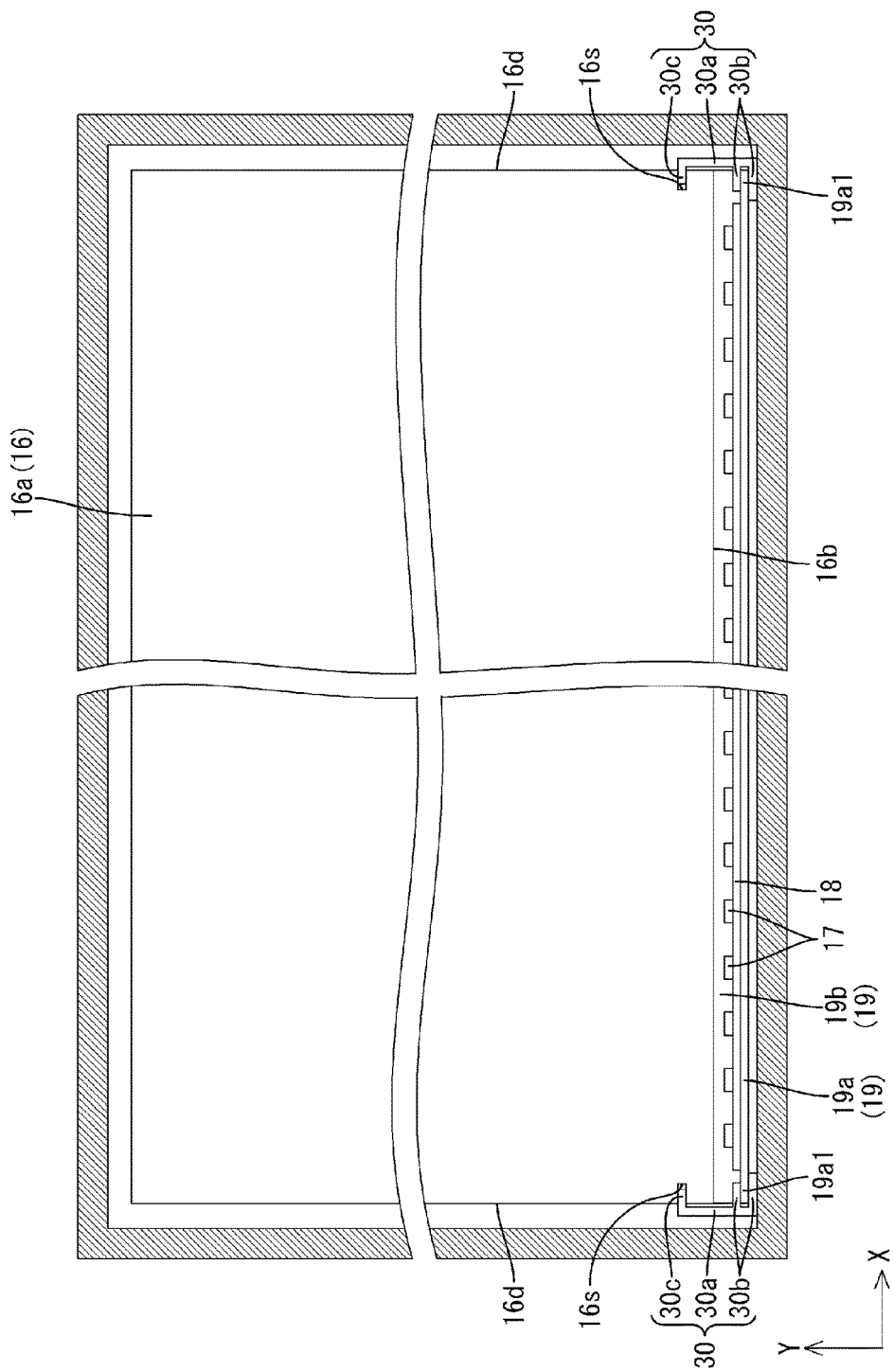
FIG. 6 is a cross-sectional plan view of a backlight device 12 when seen from a side of a light-exiting surface 16a of the light guide plate 16.
Figure 7:
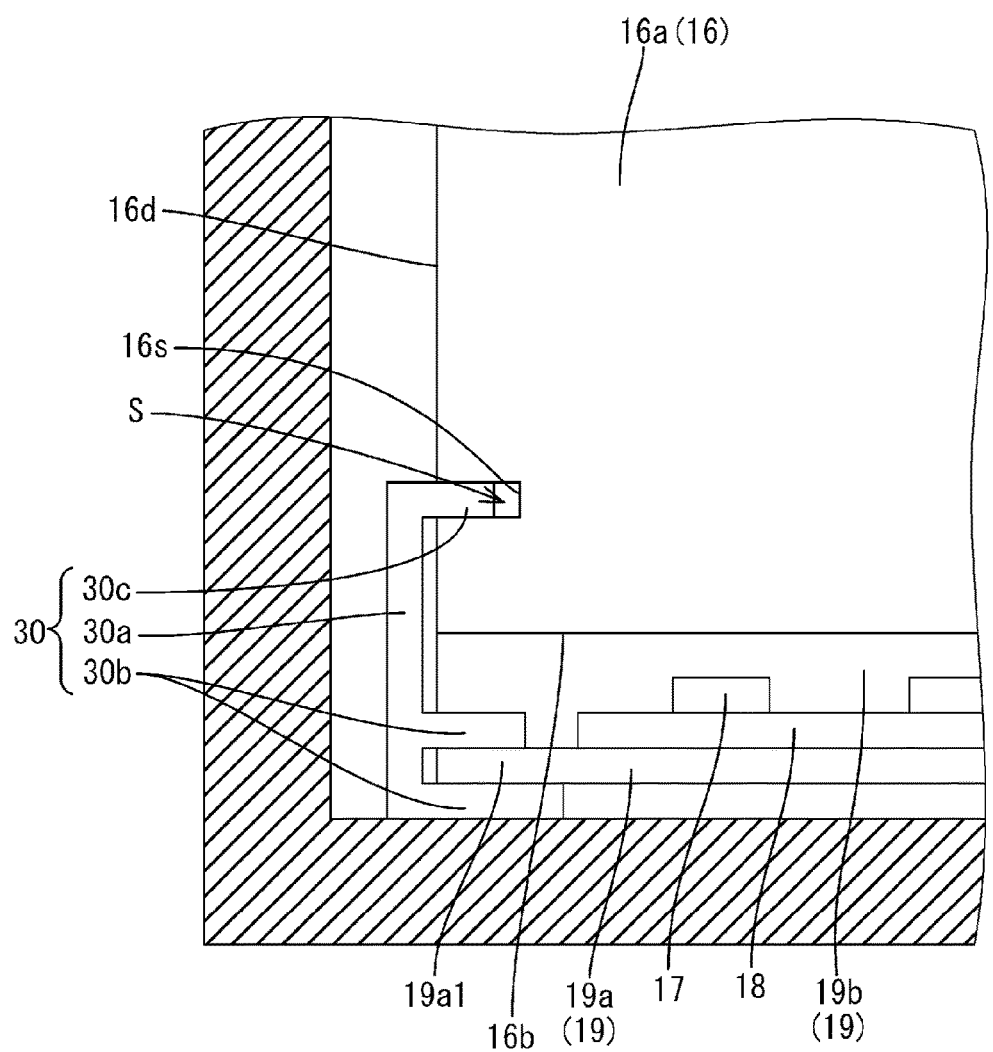
FIG. 7 is an enlarged cross-sectional plan view of a vicinity of one of metal fixtures 30 in FIG. 6.

Of the principal surfaces of the light guide plate 16, the surface facing the front side (the surface facing the optical members 15) is a light-exiting surface 16a, from which light from the inside exits toward the optical members 15 and the liquid crystal panel 11. Of the outer side faces that are adjacent to the principal surfaces of the light guide plate 16, one of the side faces on the long side extending along the x-axis direction (the side face found at one end of the short-side direction) faces the LEDs 17 (LED substrate 18) with a prescribed space therebetween. This is the light-receiving face 16b, from which light emitted by the LEDs 17 enters. On an opposite surface 16c (a surface facing the chassis 14), which is on the reverse side of the light guide plate 16, or the side opposite to the light-exiting surface 16a, a reflective sheet 20 is provided so as to cover the opposite surface 16c almost over the entire area, as shown in FIG. 4. Meanwhile, a recess 16s is provided in each of side faces 16d and 16d adjacent to the light-receiving face 16b of the light guide plate 16 (side faces along the short sides), at a part near the light-receiving face 16b, as shown in FIGS. 6 and 7. The recess 16s extends along the thickness direction (z-axis direction) of the light guide plate 16 in a groove-like shape (see FIG. 5).

The reflective sheet 20 is disposed so as to be slightly spaced apart from a bottom plate 14a of the chassis 14 while contacting the opposite surface 16c of the light guide plate 16. The reflective sheet 20 is capable of reflecting back light exiting outside from the opposite surface 16c of the light guide plate 16 and redirecting the light toward the front side. The reflective sheet 20 is made of a synthetic resin and the surface takes on a white color that is superior in light reflectivity. The short-side dimensions of the reflective sheet 20 are designed to be approximately equal to the short-side dimensions of the light guide plate 16.

Next, the LEDs 17, the LED substrate 18, and the heat dissipating member 19, which constitute the LED unit LU, will be explained in order. The LED 17, which constitutes a part of the LED unit LU, is configured by sealing an LED chip (not illustrated) using a resin material on a substrate part to be attached to the LED substrate 18. The LED chip to be mounted on the substrate part has one type of principal emission wavelength. More specifically, an LED chip that emits a blue monochromic light is used. Meanwhile, phosphors that emit prescribed colors when excited by the blue light emitted by the LED chip are dispersed and blended on the resin material that seals the LED chip, and emit a substantially white color as a whole. With respect to the phosphors, a yellow phosphor that emits a yellow color, a green phosphor that emits a green color, and a red phosphor that emits a red color, for example, can be used in any combination or individually. The LED 17 is a so-called top surface light-emitting type that has a principal light-emitting surface on a side opposite to the surface that is mounted on the LED substrate 18 (a surface facing the light-receiving face 16b of the light guide plate 16). Note that a configuration of the heat dissipating member 19 will be described later in detail.

The LED substrate 18, which constitutes a part of the LED unit LU, has a thin, long plate shape extending along the long-side direction of the light guide plate 16 (the x-axis direction; the long-side direction of the light-receiving face 16b), as shown in FIG. 4. The LED substrate 18 is housed inside the frame 13 and the chassis 14 such that the plate surface thereof is parallel to the x-axis direction and the z-axis direction, or the light-receiving face 16b of the light guide plate 16. The LED substrate 18 has approximately the same dimensions in the long-side direction (x-axis direction) as those of the light guide plate. On the inner plate surface of the LED substrate 18, or the plate surface facing the light guide plate 16 (the surface opposite to the light guide plate 16), the LEDs 17 with the configuration described above are mounted directly on the surface, or the mounting surface. On the mounting surface, a plurality of the LEDs 17 are arranged parallel to one another in a single row (in a straight line) with prescribed gaps therebetween along the long direction (x-axis direction). In other words, it can be said that a plurality of the LEDs 17 are arranged parallel to one another with gaps therebetween on one of the long side faces of the backlight device 12 along the long-side direction. The gaps between the LEDs 17 that are adjacent to one another along the x-axis direction, or the arrangement pitches of the LEDs 17, are approximately equal to one another. Note that the direction in which the LEDs 17 are lined up matches the long-side direction (x-axis direction) of the LED substrate 18. On the mounting surface of the LED substrate 18, wiring patterns (not illustrated) made of a metal film (such as copper foil) or the like, which extend along the x-axis direction and cut across the LEDs 17 to connect the adjacent LEDs 17 in series, are formed. Terminal parts formed at both ends of the wiring patterns are connected to the power supply board PWB via wiring members such as connectors and electrical wires, so as to supply driving power to each LED 17.

The heat dissipating member 19, which constitutes a part of the LED unit LU, is made of a metal with superior heat conductivity such as aluminum, for example. As shown in FIG. 4, the heat dissipating member 19 is equipped with: a raised part 19a, on which the LED substrate 18 is mounted; and a bottom part 19b, which contacts a plate surface of the chassis 14. These components are bent into a substantially L shape in cross-sectional view. The length dimension of the heat dissipating member 19 is approximately equal to the length dimension of the aforementioned LED substrate 18. The raised part 19a, which constitutes a part of the heat dissipating member 19, is raised from the bottom part 19b perpendicular to the bottom part 19b. The raised part 19a has a plate shape parallel to the plate surface of the LED substrate 18 and the light-receiving face 16b of the light guide plate 16. At the same time, the long-side direction, the short-side direction, and the thickness direction of the raised part 19a respectively match the x-axis direction, the z-axis direction, and the y-axis direction. The LED substrate 18 is mounted on a plate surface of the raised part 19a on the inner side, or the plate surface facing the light guide plate 16. The long-side dimensions of the raised part 19a are larger than the long-side dimensions of the LED substrate 18, and the short-side dimensions of the raised part 19a are larger than the short-side dimensions of the LED substrate 18. Each of the ends in the long-side direction of the raised part 19a is gripped by a gripping part 30b of the fixing member 30, which will be described later. The plate surface of the raised part 19a on the outer side, or the plate surface on the side opposite to the plate surface on which the LED substrate 18 is mounted, faces the side wall 13b of the frame 13 via the gripping parts 30b of the fixing members 30. The raised part 19a is raised from an outer edge of the bottom part 19b, which will be described next, to the front side, or the side of the frame 13, along the z-axis direction.

The bottom part 19b, which constitutes a part of the heat dissipating member 19, has a plate shape parallel to the plate surface of the chassis 14, and the long-side direction, the short-side direction, and the thickness direction of the bottom part 19b respectively match the x-axis direction, the y-axis direction, and the z-axis direction, as shown in FIG. 4. The bottom part 19b is formed so as to protrude along the y-axis direction from the end of the raised part 19a on the reverse side (the end on the chassis 14 side) toward the inner side, or toward the center of the light guide plate 16. The majority of the bottom part 19b is therefore found on the reverse side of the light guide plate 16, or the reverse side of the reflective sheet 20. In other words, the majority of the bottom part 19b is disposed so as to be gripped between (placed between) the reflective sheet 20 and the chassis 14. The bottom part 19b has approximately the same long-side dimensions as those of the raised part 19a. The entire area of the plate surface of the bottom part 19b on the reverse side, or the plate surface facing the chassis 14, contacts the bottom plate 14a of the chassis 14. This ensures that heat conducted from the LEDs 17 to the heat dissipating member 19 is dissipated effectively from the bottom part 19b to the side of the bottom plate 14a of the chassis 14.

Next, configurations of the frame 13 and the chassis 14, which constitute the exterior members as well as the holding members, will be described. The frame 13 and the chassis 14 are both made of a metal such as aluminum, and are both higher in mechanical strength (rigidity) and thermal conductivity than if made of a synthetic resin, for example. As shown in FIG. 3, the frame 13 and the chassis 14 house the liquid crystal panel 11, the optical members 15, and the light guide plate 16, which are stacked onto one another, from the front and reverse sides in a gripping manner while housing the LED unit LU at one end of the short-side direction thereof (the edge along one of the long sides).

The frame 13 has a horizontally long, frame-like shape as a whole so as to surround the display region of the display surface 11c of the liquid crystal panel 11, as shown in FIG. 3. The frame 13 has a substantially L shape in cross section and is constituted by: a panel pressing section 13a, which is parallel to the display surface 11c of the liquid crystal panel 11 and presses the liquid crystal panel 11 from the front side; and a side wall 13b, which protrudes toward the reverse side from the outer periphery of the panel pressing section 13a. Of these, the panel pressing section 13a assumes a horizontally long, frame-like shape along the outer edges (non-display region; frame part) of the liquid crystal panel 11 and is capable of pressing the outer edges of the liquid crystal panel 11 over almost the entire periphery from the front side. In addition to the periphery of the liquid crystal panel 11, the width of the panel pressing section 13a can cover, from the front side, the peripheries of the optical members 15 and the light guide plate 16, which are disposed on the outside of the periphery of the liquid crystal panel 11 in an outward direction, as well as the LED unit LU. An outer surface of the panel pressing section 13a facing the front side (a surface on the side opposite to the surface facing the liquid crystal panel 11) is exposed to the outside on the front side of the liquid crystal display device 10 in the same manner as the display surface 11c of the liquid crystal panel 11, thereby constituting the front surface of the liquid crystal display device 10 together with the display surface 11c of the liquid crystal panel 11. Meanwhile, the side wall 13b has a substantially square tube shape that protrudes toward the inner side from the outer periphery (more specifically, the outer peripheral edges) of the panel pressing section 13a. The side wall 13b is capable of surrounding the entire peripheries of the liquid crystal panel 11, the optical members 15, the light guide plate 16, and the LED unit LU, which are housed inside, while also enclosing the chassis 14 on the reverse side almost over the entire periphery. The outer faces of the side wall 13b along the periphery of the liquid crystal display device 10 are exposed to the outside along the periphery of the liquid crystal display device 10, constituting the top face, the bottom face, and the side faces of the liquid crystal display device 10.

At positions of the panel pressing section 13a closer to the inner side than the side wall 13b, abutting ribs 23 are formed as an integral whole and support the light guide plate 16 from the front side (from the display surface 11c side). The abutting ribs 23 respectively protrude toward the reverse side (toward the light guide plate 16 side) from the inner surfaces of the panel pressing section 13a along the z-axis direction (along the direction of protrusion of a screw mounting part 21). At the same time, the abutting rib 23 assumes a thin, long substantially block-like shape extending along each side of the panel pressing section 13a. The abutting rib 23 is provided on each side of the panel pressing section 13a, and has a length dimension extending across the entire length of each side. Therefore, the abutting ribs 23 are capable of supporting the light guide plate 16 from the front side (from the display surface 11c side) by gripping the light guide plate 16 with the chassis 14, and serve a function of supporting the light guide plate. As a result, the light guide plate 16 is supported by the frame-shaped abutting ribs 23 over the entire periphery from the front side.

In an inner periphery of the panel pressing section 13a, pressing protrusions 24, which project toward the reverse side, or the side of the liquid crystal panel 11, are formed as an integral whole, as shown in FIG. 4. A cushioning material 24a is attached to the protruding distal end of the pressing protrusion 24, and the pressing protrusion 24 is able to press the liquid crystal panel 11 from the front side via the cushioning material 24a. The cushioning material 24a is provided so as to extend along each side of the frame components of the frame 13, and is provided separately for each side. When the frame components are assembled, the cushioning materials 24a then assume a frame-like shape as a whole that is disposed along the entire inner periphery of the panel pressing section 13a. Formed on the side wall 13b is a screw groove 13b1, which opens toward the reverse side and is capable of tightening a screw member SM, as shown in FIG. 4.

The chassis 14 has a horizontally long rectangular shape as a whole similar to the light guide plate 16, so as to cover the light guide plate 16 and the LED unit LU and the like from the reverse side almost over the entire area, as shown in FIG. 3. The front surface of the chassis 14 faces the opposite surface 16c of the light guide plate 16 and the LED unit LU. Meanwhile, the reverse surface of the chassis 14 is exposed on the outer reverse side of the liquid crystal display device 10, and constitutes the back surface of the liquid crystal display device 10. Provided on the chassis 14 are a plurality of screw inserting holes (not illustrated), in which the screw members SM are inserted.

Now, configurations and operational effects of the pair of fixing members 30 and 30, which are the main parts of the present embodiment, will be described. Each of the pair of fixing members 30 and 30 is formed by a metal material having a heat conductivity that is lower than that of the chassis 14. This ensures both rigidity and low thermal conductivity with respect to the fixing member 30. Each of the pair of fixing members 30 and 30 is disposed on each side in the long-side direction of the light guide plate 16 (x-axis direction) near the light-receiving face 16b of the light guide plate 16, or, in other words, on each side in the long-side direction of the LED substrate 18. Each of the pair of fixing members 30 and 30 is disposed so as to be spaced apart from the side wall 13b of the frame 13. The fixing member 30 is constituted by a body part 30a, a gripping part 30b, and a locking part 30c, as shown in FIG. 8.

The body part 30a of the fixing member 30 has a plate-like shape. The body part 30a extends along a direction orthogonal to the plate surface of the raised part 19a of the heat dissipating member 19 (y-axis direction) such that the plate surface thereof faces the long-side direction (x-axis direction) of the light guide plate 16. The gripping part 30b of the fixing member 30 is constituted by two plate-like members disposed parallel to each other. The two plate-like members of the gripping part 30b extend along the long-side direction of the raised part 19a (x-axis direction) of the heat dissipating member 19 such that the plate surfaces thereof face a direction orthogonal to the plate surface of the raised part 19a (y-axis direction). The two plate-like members of the gripping part 30b are spaced apart by a distance that is slightly larger than the thickness of the plate surface of the raised part 19a. The gripping parts 30b respectively grip, between these two plate-like members, ends 19a1 and 19a1 in the long-side direction of raised part 19a of the heat dissipating member 19 (see FIG. 6) in a direction orthogonal to the plate surface of the raised part 19a (y-axis direction). Note that, in embodiments of the present invention, configurations in which "the gripping part 30b grips the raised part 19a" include not only a configuration in which the two plate-like members grip the raised part 19a while in direct contact with the plate surfaces of the raised part 19a, but also a configuration in which an end of the raised part 19a is positioned between the two plate-like members such that the two plate-like members are spaced apart from the plate surfaces of the raised part 19a by very small gaps.

The locking part 30c of the fixing member 30 has a plate-like shape, and extends along the long-side direction of the raised part 19a of the heat dissipating member 19 such that the plate surface thereof faces a direction that is orthogonal to the plate surface of the raised part 19a of the heat dissipating member 19 (y-axis direction). The locking part 30c is locked to each of the respective side faces 16d and 16d of the light guide plate 16 adjacent to the light-receiving face 16b at a part near the light-receiving face 16b. Specifically, a distal end of the locking part 30c, which has a plate-like shape, is fitted to the aforementioned recess 16s, which is provided in each of the aforementioned side faces 16d and 16d. As a result, the locking part 30c is locked to the light guide plate 16. For this reason, the thickness of the locking part 30c is designed to be slightly smaller than the thickness of the recess 16s, which has a groove-like shape. Note that the distal end of the locking part 30c is fitted to the recess 16s while leaving a very small space S (see FIG. 7) between the distal end of the locking part 30c and the bottom surface of the recess 16s.

Figure 8:
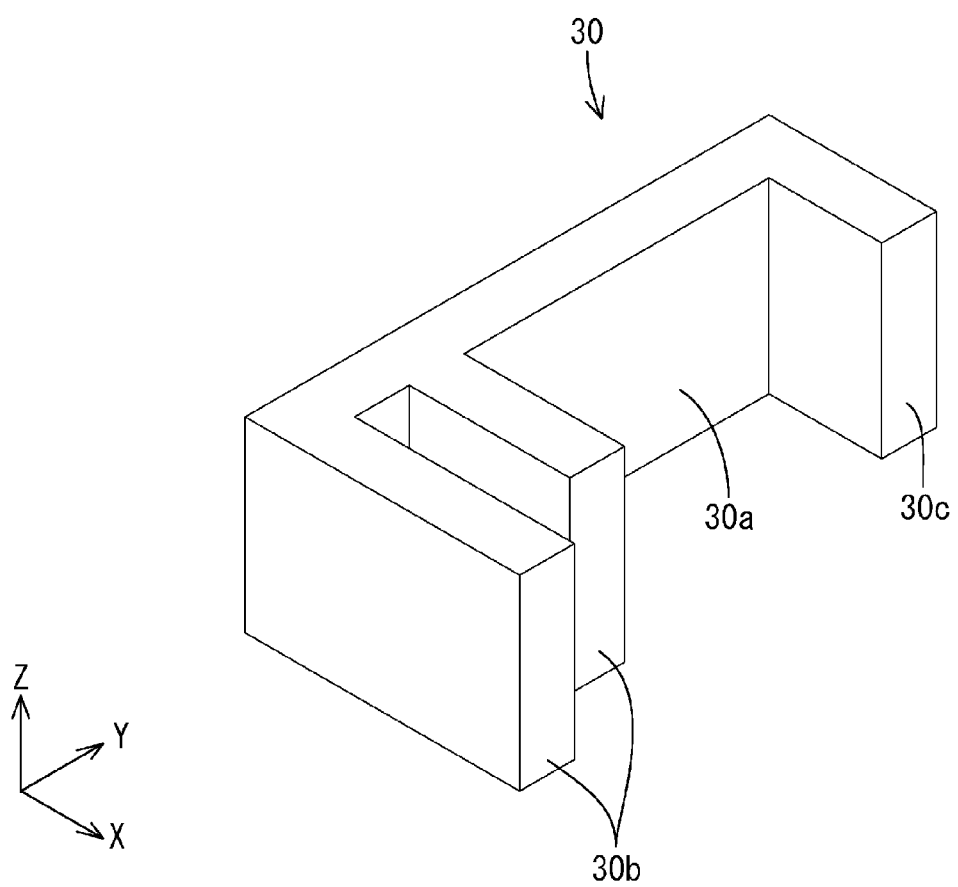
FIG. 8 is an enlarged exploded view of the metal fixture 30.

The aforementioned gripping part 30b and the locking part 30c respectively extend from the body part 30a, as shown in FIG. 8. In other words, in each of the fixing members 30 and 30, the body part 30a serves as a member that connects the gripping part 30b and the locking part 30c. As shown in FIG. 6, the fixing members 30 and 30 are disposed so as to achieve a left-right symmetry, with the gripping part 30b and the locking part 30c extending from the body part 30a toward the heat dissipating member 19. Note that the width of the body part 30a (dimension in the z-axis direction) of each of the fixing members 30 and 30 is designed to be slightly smaller than the thickness of the light guide plate 16, as shown in FIG. 5. For this reason, it is not necessary to secure a space larger than the thickness dimension of the light guide plate 16 in the thickness direction of the light guide plate 16 (z-axis direction) in order to dispose each of the fixing members 30 and 30.

Now, since the pair of fixing members 30 and 30 is configured and disposed as described above, the movement of the heat dissipating member 19 is controlled by the gripping part 30b of the fixing member 30 in a direction orthogonal to the light-receiving face 16b (y-axis direction). Then the movement of the light guide plate 16 is controlled by the locking part 30c of the fixing member 30 in a direction orthogonal to the light-receiving face 16b (y-axis direction). Since the gripping part 30b and the locking part 30c are connected by the body part 30a, as the light guide plate 16 moves in a direction orthogonal to the light-receiving face 16b (y-axis direction), the heat dissipating member 19 also moves in a direction orthogonal to the light-receiving face 16b via the fixing member 30. It follows then that the LED substrate 18 (LEDs 17), which is attached to the heat dissipating member 19, also moves, following the movement of the light guide plate 16. As a result, the pair of fixing members 30 and 30 keeps the distance between the LEDs 17 and the light-receiving face 16b of the light guide plate 16 constant.

Figure 9:
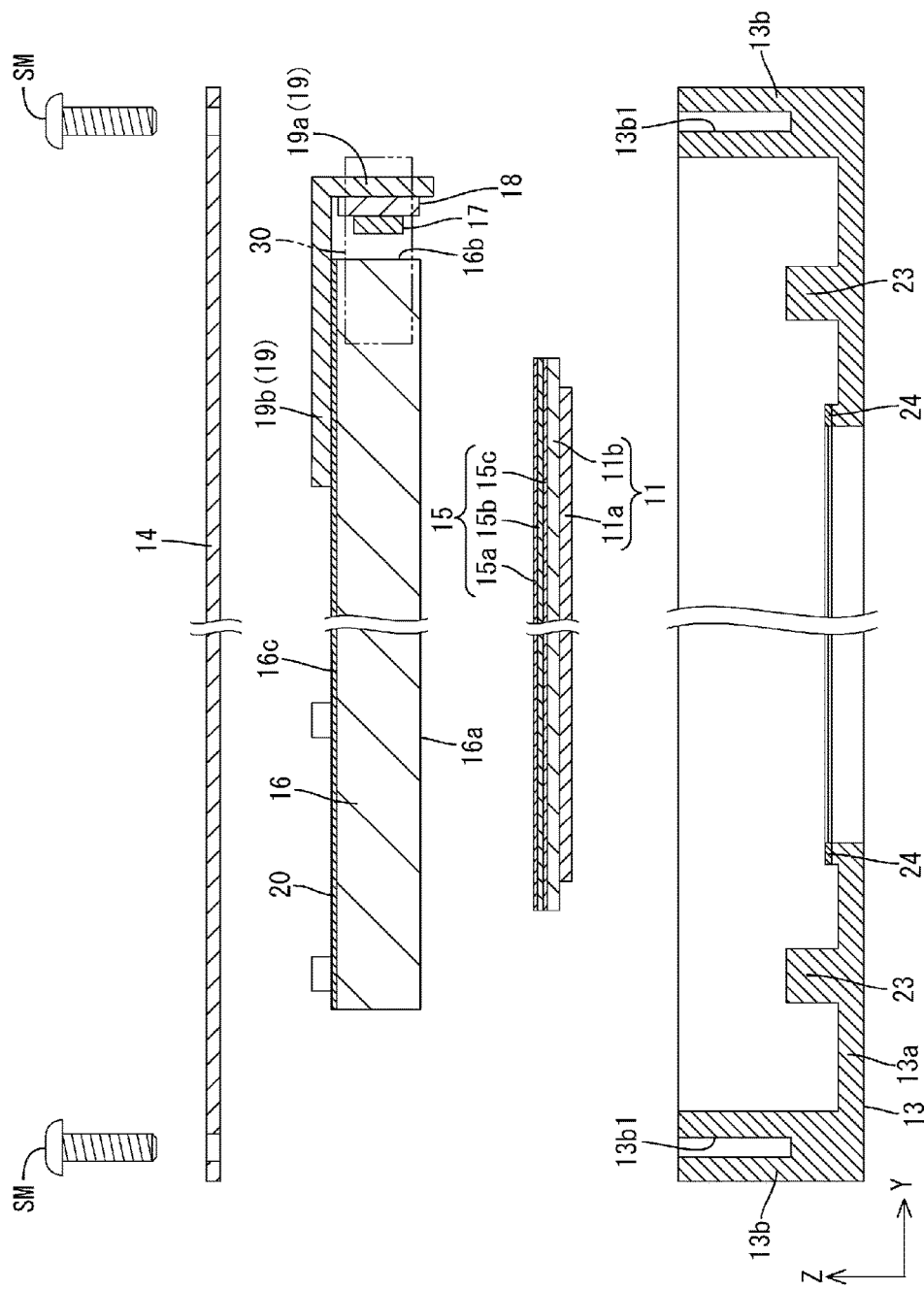
FIG. 9 is a cross-sectional view showing a manner of assembling the liquid crystal display device 10.

Next, a manner of assembling the fixing member 30 in steps of manufacturing the liquid crystal display device 10 and a manner of removing the fixing member 30 in steps of disassembling the liquid crystal display device 10 will be described. In steps of manufacturing the liquid crystal display device 10, the liquid crystal display device 10 is manufactured by assembling components from the front surface side of the liquid crystal display device 10 (top side in FIG. 4), as shown in FIG. 9. Specifically, with the frame 13 inverted, as shown in FIG. 9, the liquid crystal panel 11 and the optical members 15 are positioned so as to be stacked onto the reverse side of the frame 13. Next, the light guide plate 16 is housed in an inverted state in a substantially central part inside the frame. Then, the LED unit LU (the heat dissipating member 19; the LED substrate 18; the LEDs 17) is positioned and housed between the side wall 13b of the frame 13 and the light-receiving face 16b of the light guide plate 16. Here, since the bottom part 19b of the heat dissipating member 19, which constitutes a part of the LED unit LU, is positioned on the chassis 14 side, it is possible to house the LED unit LU inside the frame 13 after the light guide plate 16 is housed by mounting the components in an inverted state as described above. Next, the pair of fixing members 30 and 30 is mounted by sliding both of the fixing members 30 and 30 along the thickness direction (z-axis direction) of the light guide plate 16 so that the gripping part 30b of the fixing member 30 grips the end 19a1 of the raised part 19a of the heat dissipating member 19 while the locking part 30c of the fixing member 30 is fitted to the recess 16s of the light guide plate 16. The light guide plate 16 and the frame 13 are therefore fixed by the fixing members 30. Then, the chassis 14 is positioned along the direction of the plate surface (x-y plane direction) so that the screw grooves 13b1 provided in the side wall 13b of the frame 13 align with the screw inserting holes provided in the chassis 14, and the chassis 14 is stacked onto the reverse side of the frame 13 (on the distal ends of the side wall 13b). Finally, the screw members SM are tightened from the reverse side of the chassis 14. As a result, the light guide plate 16 and the LED unit LU are housed between the frame 13 and the chassis 14 while the light guide plate 16 and the LED unit LU are fixed to each other by the fixing members 30. The above steps complete the liquid crystal display device 10.

Meanwhile, in the steps of disassembling the liquid crystal display device 10, the components are removed in an order opposite to the steps of manufacturing described above. In a conventional configuration where the fixing members, to which the LED unit is attached, are affixed so as to grip the light guide plate along the thickness direction thereof, it is difficult to remove the LED unit unless the light guide plate is removed first in the steps of disassembly. In contrast, in the configuration according to the present embodiment, because the locking part 30c of the fixing member 30 is locked to the side face 16d of the light guide plate 16, the LED unit LU can be removed without removing the light guide plate 16. Therefore, it is possible to improve workability in the steps of disassembling the liquid crystal display device 10.

Thus, in the backlight device 12 according to the present embodiment, each of the pair of fixing members 30 and 30 is disposed at each end of the LED substrate 18. The locking part 30c of the fixing member 30, which is locked to the light guide plate 16, is fixed to the gripping part 30b, which grips the heat dissipating member 19 at each end. For this reason, when the light guide plate 16 undergoes thermal expansion or the like, the gripping part 30b follows the movement of the locking part 30c caused by the extension and contraction of the light guide plate 16. As a result, the distance between the LED substrate 18 and the light guide plate 16, or the distance between the LEDs 17 and the light guide plate 16, is kept constant. This improves the utilization efficiency of light emitted by the LEDs 17, making it possible to prevent and suppress display unevenness. Further, in the backlight device 12 according to the present embodiment, each of the pair of fixing members 30 and 30 is disposed at each side in the long-side direction of the LED substrate 18. For this reason, disposing the fixing member 30 does not increase the thickness of the backlight device 12 (thickness along the thickness direction of the light guide plate 16), and it is possible to achieve a thinner backlight device 12. Thus, the backlight device 12 according to the present embodiment allows for a thinner device while preventing and suppressing display unevenness by keeping the distance between the light guide plate 16 and the LEDs 17 constant.

Additionally, in the backlight device 12 according to the present embodiment, the light guide plate 16 has a pair of recesses 16s and 16s, respectively provided in the side faces 16d adjacent to the light-receiving face 16b on the light-receiving face 16b side and respectively extending along the thickness direction of the light guide plate 16. Further, the locking part 30c is locked to the light guide plate 16 by being fitted to the recess 16s. According to this configuration, it is possible to effectively fix the locking part 30c to the light guide plate 16 by fitting and locking the locking part 30c to the recess 16s.

In addition, in the backlight device 12 according to the present embodiment, the locking part 30c is fitted to the recess 16s such that the space S is left between the locking part 30c and the recess 16s. According to this configuration, even if the light guide plate 16 stretches in the plate-surface direction (the long-side direction of the raised part 19a), the part of the light guide plate 16 facing the locking part 30c stretches inside the aforementioned space S, making it more difficult for the fixing member 30 to be pushed out of the recess 16s as a consequence of the stretching of the light guide plate 16. As a result, it is possible to maintain the position of the fixing member 30 even if the light guide plate 16 undergoes stretching or the like.

Additionally, in the backlight device 12 according to the present embodiment, each of the fixing members 30 and 30 is disposed so as to be spaced apart from the frame 13. According to this configuration, it is less likely that the fixing member 30 interferes with the frame 13, even if the light guide plate 16 expands laterally along the long-side direction of the light-receiving face 16b (x-axis direction). As a result, it is possible to prevent and suppress deformation, damage, or the like to the fixing member 30 caused by the fixing member 30 interfering with the frame 13.

Further, the backlight device 12 according to the present embodiment is configured such that the locking part 30c can be locked to the light guide plate 16 by causing the locking part 30c to slide along the thickness direction of the light guide plate 16. According to this configuration, it is possible to remove the fixing member 30 without removing the light guide plate 16 from inside the chassis 14 and the frame 13 when the backlight device 12 is disassembled, thereby making the disassembly of the backlight device 12 easier.

In addition, in the backlight device 12 according to the present embodiment, the bottom part 19b extends from the edge of the raised part 19a on the chassis 14 side toward the center of the light guide plate 16. If the bottom part 19b is configured so as to extend from the edge of the raised part 19a on the chassis 14 side toward the side opposite to the center of the light guide plate 16, it would become necessary to secure a larger space to dispose the bottom part 19b between the heat dissipating member 19 and the side wall 13b of the frame 13. This will therefore make it more difficult to make the frame of the backlight device 12 narrower. According to the configuration of the present embodiment, it is not necessary to secure a large space to dispose the bottom part 19b between the heat dissipating member 19 and the side wall 13b of the frame 13. This makes it possible to effectively transfer heat from the bottom part 19b to the chassis 14 side and allow the frame of the backlight device 12 to be narrower.

Note that, in the backlight device 12 according to the present embodiment, even if the light guide plate 16 stretches in the plate-surface direction due to thermal expansion or the like, the fixing member 30 is pushed out along the plate-surface direction away from the light guide plate 16, making it less likely for the fixing member 30 to undergo deformation or the like. This suppresses and prevents a change in the distance between the LEDs 17 and the light guide plate 16 as a result of the deformation or the like of the fixing member 30. Further, in the backlight device 12 according to the present embodiment, the fixing member 30 and the heat dissipating member 19 are separate members. As a result of this configuration, heat is less likely to be transmitted to the light guide plate 16 side via the fixing member 30 than in a configuration where the fixing member 30 and the heat dissipating member are formed as an integral whole. This prevents and suppresses the thermal deformation or the like of the light guide plate 16 as a result of heat transfer to the light guide plate 16 side.

In a conventional configuration in which only a spacer member is provided between the light guide plate and the LED substrate, it is possible to regulate the distance between the LEDs and the light guide plate when the light guide plate stretches due to thermal expansion or the like. However, when the light guide plate contracts, the spacer member moves away from the light guide plate or the LED substrate. As a result, the distance between the LEDs and the light guide plate cannot be kept constant. According to the configuration of the present embodiment, in contrast, the fixing member 30, which indirectly secures the LED substrate 18, is locked to the light guide plate 16. For this reason, even if the light guide plate 16 contracts, the fixing member 30 moves with the contraction, causing the LED substrate 18 to move at the same time. Therefore, it is possible to keep the distance between the LEDs 17 and the light guide plate 16 constant even if the light guide plate 16 contracts.

Additionally, if the backlight device 12 is not equipped with the heat dissipating member 19 and the gripping part 30b of the fixing member 30 is configured so as to grip the ends of the LED substrate 18 in the long-side direction, it would be difficult to effectively dissipate heat from the LEDs 17 to the chassis 14 side. Further, since the wiring patterns and the like are formed on the surface of the LED substrate 18, it will be difficult to grip the LED substrate 18 using the gripping part 30b without interfering with the wiring patterns and the like. In contrast, according to the configuration of the present embodiment, the gripping part 30*b* of the fixing member 30 grips each end of the heat dissipating member 19, on which the LED substrate 18 is mounted. As a result, it is possible to mount the fixing member 30 without impacting the wiring patterns and the like of the LED substrate 18, while achieving an effective heat dissipation path.

<Modification Example 1 of Embodiment 1>

Figure 10:
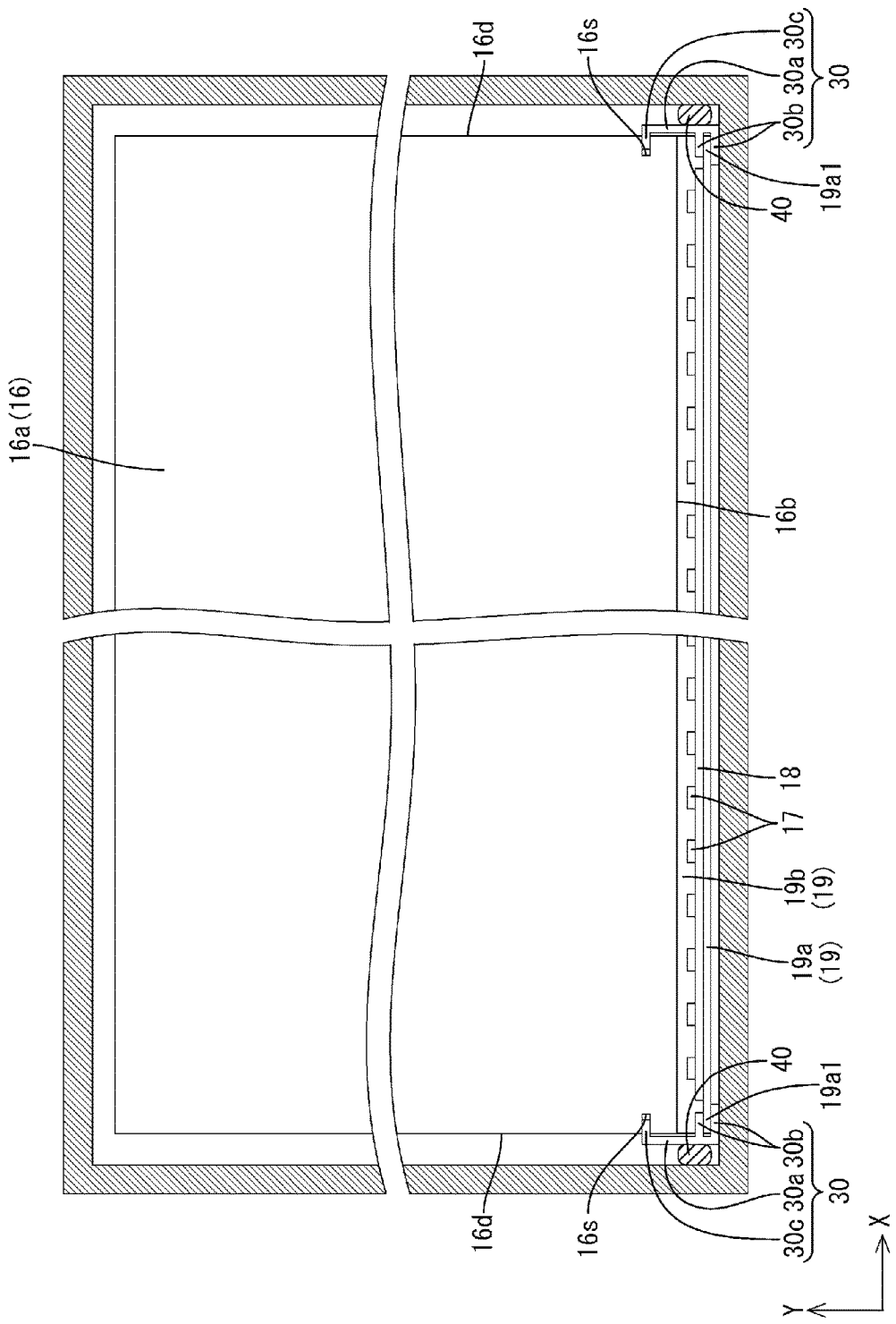
FIG. 10 is a cross-sectional plan view of a backlight device 12 when seen from a side of a light-exiting surface 16a of a light guide plate 16 according to Modification Example 1 of Embodiment 1.

Next, Modification Example 1 of Embodiment 1 will be described. A backlight device 12 according to Modification Example 1 is equipped with a pair of cushioning members 40 and 40, and is therefore different from that of Embodiment 1 in that regard. Other configurations are identical to those of Embodiment 1, and descriptions of the structures, operations, and effects thereof will be omitted. In Modification Example 1 of Embodiment 1, a block-shaped cushioning member 40 is disposed between a body part 30*a* of each of fixing members 30 and 30 and a side wall 13*b* of a frame 13, as shown in FIG. 10. The cushioning member 40 is made of a urethane material.

In the present modification example, by disposing the cushioning member 40 in this manner, the distances between the pair of fixing members 30 and 30 and the frame 13 are respectively regulated by the cushioning members 40. For this reason, even if the light guide plate 16 undergoes thermal expansion or the like, the light guide plate 16 and the fixing members 30 are less likely to shift to one side or the other along the plate-surface direction of the light guide plate 16 (the long-side direction of the raised part 19*a*). Further, the cushioning member 40 is made of a urethane material, which effectively makes the cushioning member 40 contractible.

<Modification Example 2 of Embodiment 1>

Figure 11:
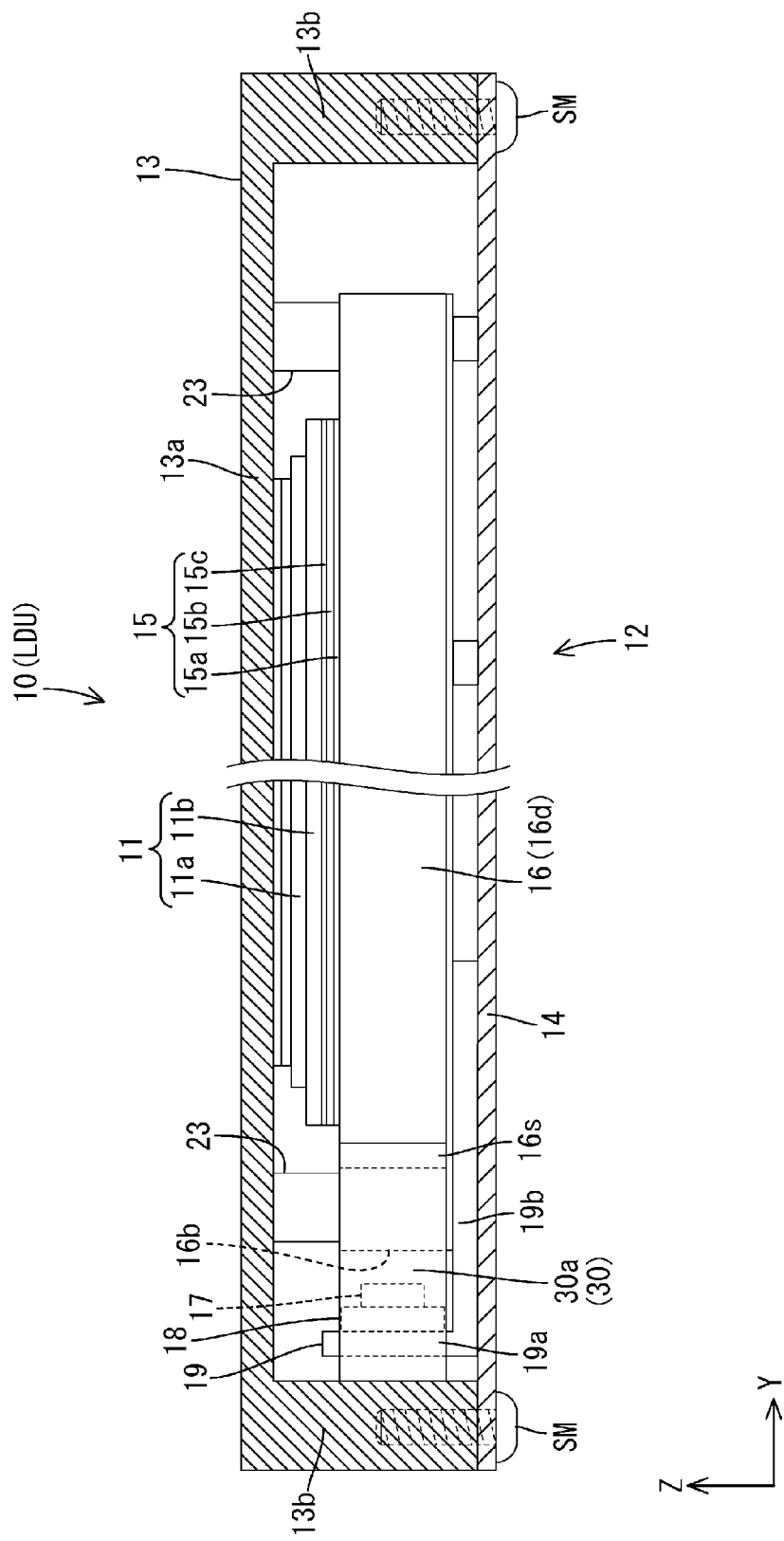
FIG. 11 is a side view of a liquid crystal display device 10 when seen from a side of one short side of a light guide plate 16 according to Modification Example 2 of Embodiment 1.

Next, Modification Example 2 of Embodiment 1 will be described. In a backlight device 12 according to Modification Example 2, the width of a body part 30*a* of a fixing member 30 is different from that of Embodiment 1. Other configurations are identical to those of Embodiment 1, and descriptions of the structures, operations, and effects thereof will be omitted. In Modification Example 2 of Embodiment 1, the width of the body part 30*a* of each of the fixing members 30 and 30 (dimension along the z-axis direction) is the same as the dimension of the light guide plate 16 along the thickness direction, as shown in FIG. 11. According to the present modification example, by designing the width dimension of the body part 30*a* of the fixing member 30 in such a manner, light emitted by the LEDs 17 and proceeding toward a side (toward a side along the long-side direction of the raised part 19*a*) is more easily blocked by the body part 30*a* than if the width of the body part 30*a* is smaller than the dimension of the light guide plate 16 in the thickness direction. This makes it less likely that light emitted by the LEDs 17 leaks to the side. As a result, it is possible to prevent and suppress luminance unevenness in the display surface 11*c* of the liquid crystal panel 11 caused by light leakage.

<Embodiment 2>

Embodiment 2 will be described with reference to diagrams. In Embodiment 2, the configuration of the part of a light guide plate 116 that is locked to a locking part 130*c* of a fixing member 130 is different from the equivalent in Embodiment 1. Other configurations are identical to those of Embodiment 1, and descriptions of the structures, operations, and effects thereof will be omitted. Note that in FIGS. 12 and 13, parts identical to those described in Embodiment 1 are marked with reference characters that are 100 greater in number than those of FIGS. 6 and 7, respectively.

Figure 12:
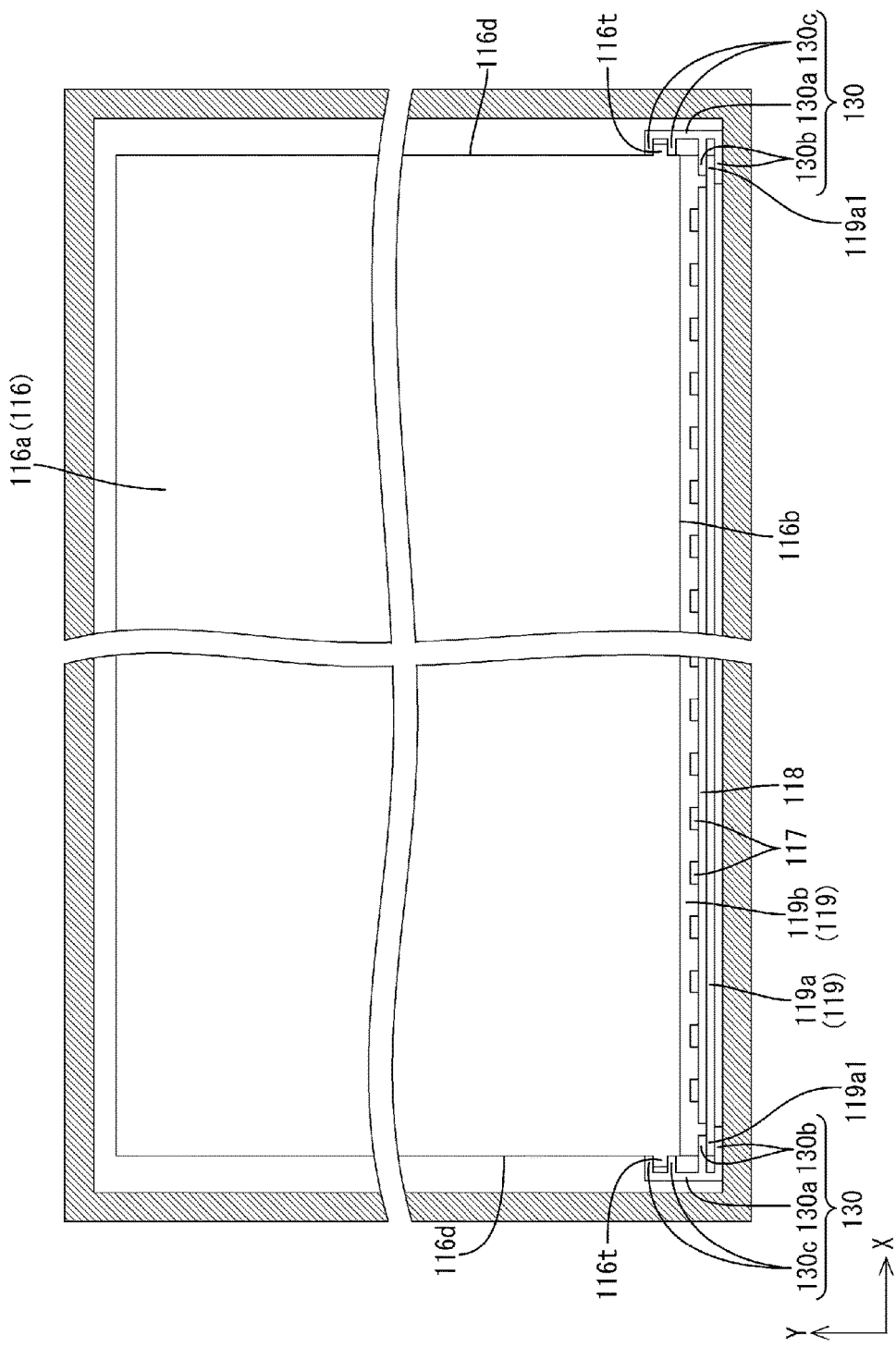
FIG. 12 is a cross-sectional plan view of a backlight device 112 according to Embodiment 2 when seen from a side of a light-exiting surface 116a of a light guide plate 116.
Figure 13:
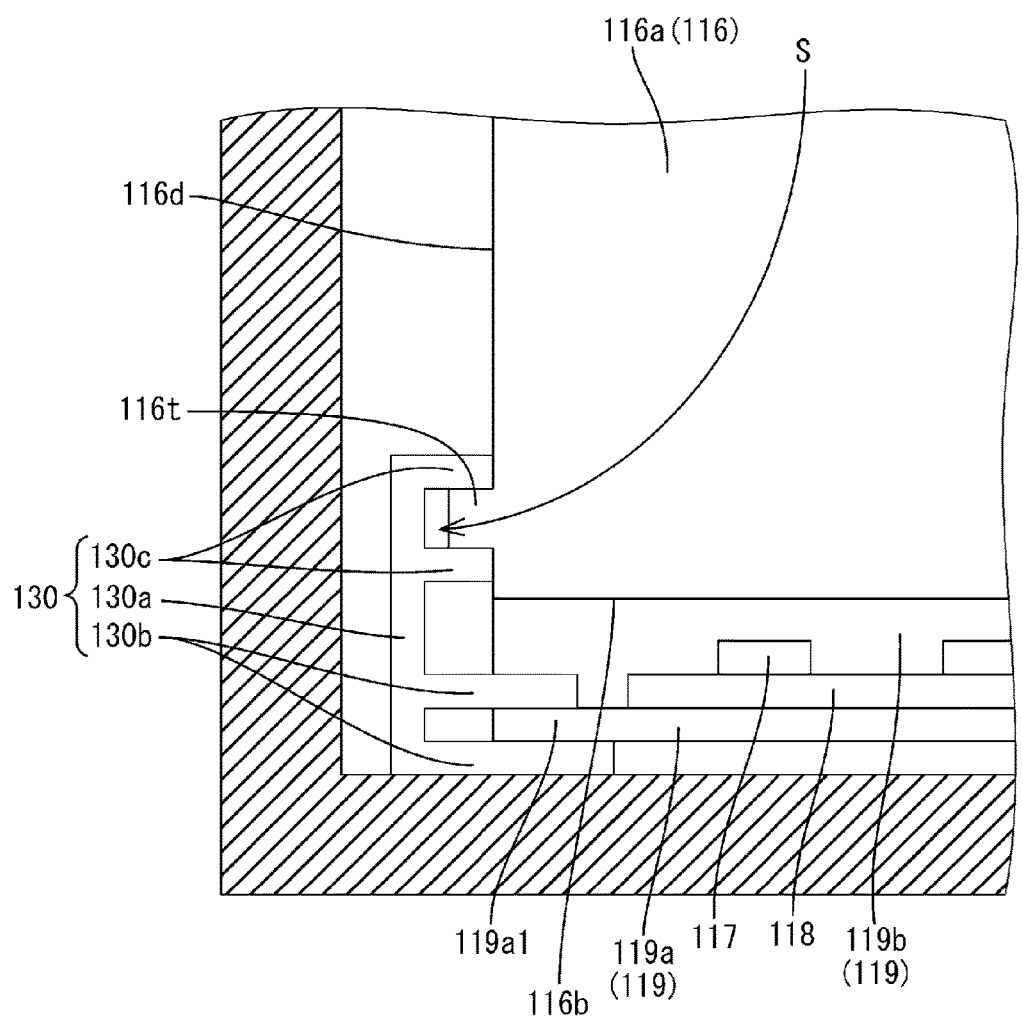
FIG. 13 is an enlarged cross-sectional plan view of a vicinity of one of metal fixtures 130 in FIG. 12.

In a backlight device 112 according to Embodiment 2, a protrusion 116*t*, which extends along the thickness direction of a light guide plate 116 (the z-axis direction) (see FIG. 5), is provided in each of side faces 116*d* and 116*d* of the light guide plate 116 adjacent to a light-receiving face 116*b*, at a part near the light-receiving face 116*b*, as shown in FIGS. 12 and 13. In the present embodiment, additionally, a locking part 130*c* of a fixing member 130 is constituted by two plate-like members arranged parallel to each other in the same manner as a gripping part 130*b*. These two plate-like members, in the same manner as the gripping part 130*b*, extend along the long-side direction (x-axis direction) of a raised part 119*a* of a heat dissipating member 119 such that the plate surfaces thereof face the direction orthogonal to the plate surface of the raised part 119*a* (y-axis direction). The locking part 130*c* then grips, between these two plate-like members, the aforementioned protrusion 116*t* provided in the light guide plate 116 in a direction orthogonal to the plate surface of the raised part 19*a* (y-axis direction). As a result, the locking part 130*c* is locked to the light guide plate 116. For this reason, the two plate-like members of the locking part 130*c* are spaced apart by a distance that is slightly larger than the thickness of the protrusion 116*t*. Note that the distal end of the locking part 130*c* is fitted to the protrusion 116*t* while a very small space S (see FIG. 13) is left between the distal end and the top surface of the protrusion 116*t*.

When the recess 16*s* is provided in the light guide plate 16 as is the case in Embodiment 1, light entering the light guide plate 16 may leak into the recess 16*s* and cause unevenness in the light guide plate 16. In contrast, by providing the protrusion 116*t* at the parts of the light guide plate 116 that are locked to the locking part 130*c*, as is the case in the present embodiment, it is possible to prevent unevenness in light entering the light guide plate 116. Further, in the present embodiment, the locking part 130*c* of the fixing member 130 is configured so as to grip the protrusion 116*t* of the light guide plate 116 while the space S is left between the locking part 130*c* and the protrusion 116*t*. According to this configuration, even if the light guide plate 116 stretches along the plate-surface direction (long-side direction of the raised part), the part of the light guide plate 116 facing the locking part 130*c* stretches inside the aforementioned space S. For this reason, the fixing member 130 is less likely to be pushed in a direction away from the light guide plate 116 when the light guide plate 116 stretches. As a result, it is possible to maintain the position of the fixing member 130 even if the light guide plate 116 undergoes stretching or the like.

<Embodiment 3>

Embodiment 3 will be described with reference to diagrams. Embodiment 3 is different from Embodiment 1 in that a heat conducting member 250 is disposed between a fixing member 230 and a frame 213. Other configurations are identical to those of Embodiment 1, and descriptions of the structures, operations, and effects thereof will be omitted. Note that in FIG. 14, parts identical to those described in Embodiment 1 are marked with reference characters that are 200 greater in number than those of FIG. 5.

Figure 14:
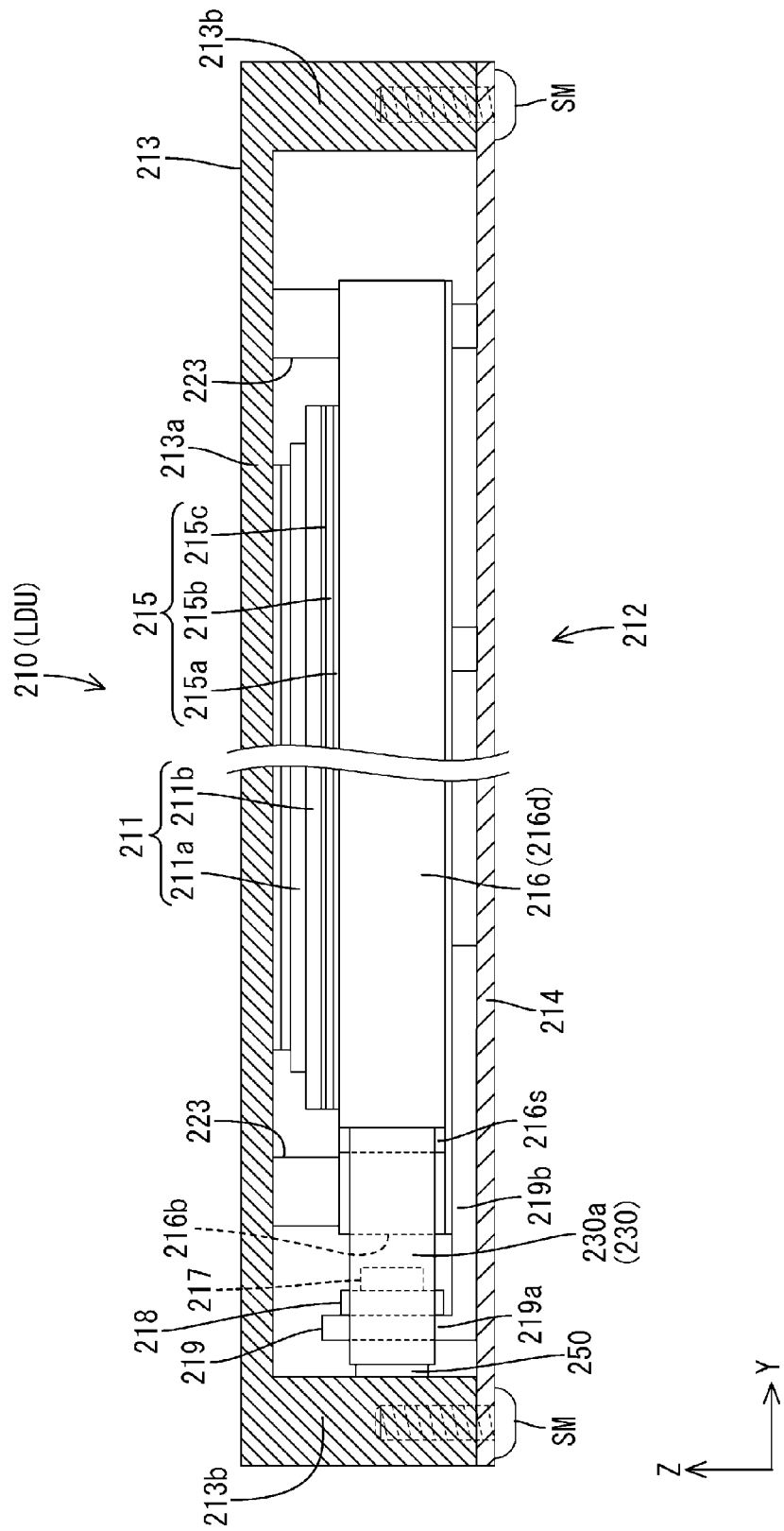
FIG. 14 is a side view of a liquid crystal display device 210 according to Embodiment 3 when seen from a side of one short side of a light guide plate 216.

In a backlight device 212 according to Embodiment 3, a heat conducting member 250, which has a contractible property, is disposed between the part of a gripping part 230*b* of a fixing member 230 that is on the reverse side of a raised part 219*a* (on the side opposite to the side on which an LED substrate 218 is attached) and a side wall 213*b* of a frame 213, as shown in FIG. 14. According to the present embodiment, by disposing the heat conducting member 250 in this manner, it is possible to absorb the movement of the raised part 219a with the heat conducting member 250 if the raised part 219a is pushed away from a light guide plate 216 via the fixing member 230 due to a thermal expansion or the like of the light guide plate 216. At the same time, it is possible to disperse heat from the raised part 219a toward the frame 213 side via the heat conducting member 250.

Modification examples of the embodiments described above are listed below:

(1) Illustrated in each of the embodiments described above is a configuration of a fixing member in which the gripping part and the locking part are connected by the body part that extends in a direction perpendicular to the plate surface of the raised part of the heat dissipating member. However, this does not limit other configurations of the fixing member, provided that the fixing member has a gripping part and a locking part.

(2) Illustrated in each of the embodiments described above is a configuration in which a recess or a protrusion is provided in the light guide plate, and the locking part is locked to the light guide plate by fitting the locking part to the recess or causing the locking part to grip the protrusion. However, this does not limit the configurations or the manners in which the locking part is locked to the light guide plate.

(3) Illustrated in each of the embodiments described above is a configuration in which a light-receiving face is provided on only one of the side faces of the light guide plate and one LED unit is housed inside the backlight device. However, a configuration in which a light-receiving face is provided on a plurality of the side faces of the light guide plate and a plurality of LED units are housed inside the backlight device is also acceptable. In this case, a configuration in which pairs of fixing members are respectively provided for a plurality of LED units may be used.

(4) In each of the embodiments described above, a liquid crystal display device that is not equipped with a cabinet, or a so-called non-cabinet type, is used as an example. However, the present invention is also applicable to a liquid crystal display device equipped with a cabinet.

(5) The configurations, shapes, positions, and other aspects of the fixing member described in each of the embodiments above can be modified appropriately.

(6) In each of the embodiments described above, a liquid crystal display device using a liquid crystal panel as a display panel is used as an example. However, the present invention is also applicable to display devices using other types of display panels.

Embodiments of the present invention were described above in detail, but these are merely illustrative, and not limiting the scope of the claims. The technical scope defined by the claims includes various modifications of the specific examples described above.

In addition, the technical elements described in the specification or the diagrams herein demonstrate technical utility independently or in various combinations, and are not limited by the combinations described in the claims at the time of submitting this application. Further, the technologies illustrated in this specification or the diagrams herein are intended to achieve multiple objectives at the same time, and are deemed to have technical utility by achieving one of such objectives.

DESCRIPTION OF REFERENCE CHARACTERS

TV television receiver
LDU liquid crystal display unit
PWB power supply board
MB main board
CTB control board
CV cover member
ST stand
LU LED unit
10, 110, 210 liquid crystal display device
11, 111, 211 liquid crystal panel
12, 112, 212 backlight device
13, 113, 213 frame
14, 114, 214 chassis
15, 115, 215 optical member
16, 116, 216 light guide plate
16b, 116b, 216b light-receiving face
17, 117, 217 LED
18, 118, 218 LED substrate
20, 120, 220 reflective sheet
30, 130, 230 fixing member
30a, 130a body part
30b, 130b gripping part
30c, 130c locking part

What is claimed is:

1. An illumination device, comprising:
a light source;
a light source substrate having a rectangular plate shape, said light source being disposed on one surface of the light source substrate;
a light guide plate that guides light from said light source and that has a light-exiting surface, an opposite surface that is opposite to said light-exiting surface, and at least one rectangular light-receiving side face facing said light source and having a long-side direction parallel to a long-side direction of the light source substrate;
a chassis having at least a bottom plate that is disposed on a side of the opposite surface of said light guide plate;
a frame on a side of said light-exiting surface of the light guide plate and housing at least said light source and said light guide plate between said frame and said chassis;
a heat dissipating member having heat dissipating characteristics and comprising a bottom part that has a plate shape parallel to the bottom plate of said chassis and that is disposed on said bottom plate, and a raised part that rises from said bottom part in a rectangular plate-like shape so as to attach thereon the light source substrate such that a long-side direction of said raised part and the long-side direction of said light source substrate are parallel to each other, and such that a length along the long-side direction of said raised part is greater than a length along a long-side direction of said light source substrate; and
a pair of fixing members at respective sides in the long-side direction of said light source substrate, each of the fixing members comprising a gripping part and a locking part, said gripping part extending along the long-side direction of said raised part and gripping each end in the long-side direction of said raised part along a direction orthogonal to a surface of said raised part, and said locking part extending along the long-side direction of said raised part and locking each side face of the light guide plate abutting the light-receiving side face thereof, said pair of fixing members thereby maintaining a gap between said light source substrate and said light guide plate.

2. The illumination device according to claim 1, wherein said light guide plate has recesses respectively provided in said side faces of the light guide plate abutting said light-receiving side face thereof and respectively extending along a thickness direction of said light guide plate, and wherein said locking part of each of the fixing members is locked to said light guide plate by being fitted to the corresponding recess.

3. The illumination device according to claim 2, wherein said locking part of each of the fixing members is fitted to the corresponding recess such that a gap exists between said locking part and said recess in a direction that is parallel to the long-direction of the light-receiving side face.

4. The illumination device according to claim 1, wherein said light guide plate has protrusions respectively provided in said side faces of the light guide plate abutting said light-receiving side face thereof and respectively extending along a thickness direction of said light guide plate, and wherein said locking part of each of the fixing members is locked to said light guide plate by the locking part gripping the corresponding protrusion in the direction orthogonal to the surface of said raised part.

5. The illumination device according to claim 4, wherein said locking part of each of the fixing members grips said corresponding protrusion such that a gap exists between said locking part and said protrusion in a direction that is parallel to the long-side direction of the light-receiving side face.

6. The illumination device according to claim 1, wherein a cushioning member made of a urethane material is disposed between each of said pair of fixing members and said frame.

7. The illumination device according to claim 1, wherein said fixing members are spaced apart from said frame.

8. The illumination device according to claim 1, wherein a heat conducting member having contractible characteristics is disposed between said raised part of the heat dissipating member and said frame.

9. The illumination device according to claim 1, wherein each of said pair of fixing members has a body part extending in the direction orthogonal to the surface of said raised part and connecting said gripping part and said locking part, and wherein a width of said body part is equal to a thickness of said light guide plate.

10. The illumination device according to claim 1, wherein the fixing members are formed by a metal material having a thermal conductivity that is lower than a thermal conductivity of said chassis.

11. The illumination device according to claim 1, wherein said locking part of each of the fixing members can be locked to said light guide plate by causing said locking part to slide along a thickness direction of said light guide plate.

12. The illumination device according to claim 1, wherein said bottom part of the heat dissipating member extends from an edge of said raised part on a side of said bottom plate toward a central side of said light guide plate.

13. A display device, comprising:
the illumination device according to claim 1; and
a display panel that displays an image with light from the illumination device.

14. The display device according to claim 13, wherein said display panel is a liquid crystal panel using liquid crystal.

15. A television receiver, comprising:
the display device according to claim 13.

* * * * *